(12) United States Patent
Wagatsuma

(10) Patent No.: US 10,033,909 B2
(45) Date of Patent: Jul. 24, 2018

(54) PRINT MANAGEMENT APPARATUS, COMPUTER READABLE RECORDING MEDIUM STORED WITH PRINT MANAGEMENT PROGRAM, PRINT MANAGEMENT SYSTEM, AND IMAGE FORMING APPARATUS CAPABLE OF MAINTAINING SECURITY WITHOUT DEPENDING ON ONLY CONSCIOUSNESS OF AN INDIVIDUAL

(71) Applicant: Konica Minolta, Inc., Chiyoda-ku, Tokyo (JP)

(72) Inventor: Yoshifumi Wagatsuma, Koganei (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/050,057

(22) Filed: Feb. 22, 2016

(65) Prior Publication Data

US 2016/0286085 A1  Sep. 29, 2016

(30) Foreign Application Priority Data

Mar. 25, 2015  (JP) ................................. 2015-061836

(51) Int. Cl.
| | |
|---|---|
| G06K 15/00 | (2006.01) |
| H04N 1/44 | (2006.01) |
| H04N 1/00 | (2006.01) |
| G06F 3/12 | (2006.01) |

(52) U.S. Cl.
CPC ......... *H04N 1/4413* (2013.01); *G06F 3/1222* (2013.01); *G06F 3/1238* (2013.01); *G06F 3/1267* (2013.01); *G06F 3/1285* (2013.01); *H04N 1/00212* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 8,994,498 | B2 * | 3/2015 | Agrafioti | G06F 21/40 340/5.52 |
| 2010/0208287 | A1 * | 8/2010 | Hanaoka | G06F 21/608 358/1.15 |
| 2012/0212778 | A1 * | 8/2012 | Sakai | G06K 15/402 358/1.15 |

(Continued)

FOREIGN PATENT DOCUMENTS

JP  2010-178285 A  8/2010

*Primary Examiner* — Henok A Shiferaw
(74) *Attorney, Agent, or Firm* — Buchanan Ingersoll & Rooney PC

(57) ABSTRACT

The print management apparatus includes a condition acquisition unit that acquires designated agent information and designated person number information, an authentication unit that inquires of the designated agent information about user identification information provided from a user intended to perform printing, and authenticates that the user is a designated agent designated by an inputter himself/herself, and a print control unit that allows an image forming apparatus to perform the printing based on the print job when designated agents corresponding to the number designated by the designated are authenticated by the authentication unit via same the image forming apparatus.

20 Claims, 20 Drawing Sheets

(56) References Cited

U.S. PATENT DOCUMENTS

2015/0055162 A1* 2/2015 Nakajima .............. G06F 21/608
    358/1.13
2015/0062636 A1* 3/2015 Kanbayashi .......... G06F 3/1203
    358/1.15

* cited by examiner

FIG.11

| NAME | INDIVIDUAL ID | MAIL ADDRESS |
|---|---|---|
| ○○○ | 0001 | xxx@xxx.xxx |
| △△△ | 0002 | xxx@xxx.xxx |
| ××× | 0003 | xxx@xxx.xxx |
| □□□ | 0004 | xxx@xxx.xxx |
| ⋮ | ⋮ | ⋮ |

FIG.12

| JOB ID | INPUTTER ID | DESIGNATED AGENT INFORMATION | DESIGNATED PERSON NUMBER INFORMATION | PROXY AUTHORITY INFORMATION |
|---|---|---|---|---|
| **** | A | 0001 – 0006 | 2 | SINGLE JOB |

FIG.13

| JOB ID | INPUTTER ID | DESIGNATED AGENT INFORMATION | DESIGNATED PERSON NUMBER INFORMATION | PROXY AUTHORITY INFORMATION |
|---|---|---|---|---|
| **** | A | 0001 – 0006 | 2 | SINGLE JOB |
| **** | B | 0012 – 0024 | 6 | SINGLE JOB |
| **** | A | 0004, 0005, 0006 | 2 | ALL JOBS |
| **** | C | — | — | — |
| ... | ... | ... | ... | ... |

FIG.17

| JOB ID | AUTHENTICATED ID | AUTHENTICATION TIME |
|---|---|---|
| **** | 0001 | xx:xx |
| | 0003 | xx:xx |

PRINT MANAGEMENT APPARATUS, COMPUTER READABLE RECORDING MEDIUM STORED WITH PRINT MANAGEMENT PROGRAM, PRINT MANAGEMENT SYSTEM, AND IMAGE FORMING APPARATUS CAPABLE OF MAINTAINING SECURITY WITHOUT DEPENDING ON ONLY CONSCIOUSNESS OF AN INDIVIDUAL

CROSS-REFERENCE TO RELATED APPLICATION

This application is based on Japanese Patent Application No. 2015-061836 filed on Mar. 25, 2015, the contents of which are incorporated herein by reference.

BACKGROUND

1. Technical Field

The present invention relates to a print management apparatus, a computer readable recording medium stored with a print management program, a print management system, and an image forming apparatus.

2. Description of Related Art

In recent years, since consciousness for information security has been enhanced in the whole society, there is a case in which the use of an image forming apparatus such as a printer installed in an office, etc., is limited to a specific user.

For example, there is a system, etc., in which in the case of outputting a printed matter from an image forming apparatus installed at a place separated from one's seat, until a person himself/herself having inputted a print job goes to the place of the image forming apparatus and finishes authentication, it is not possible to output the printed matter.

However, when the person himself/herself having inputted the print job cannot go to the place of the image forming apparatus in order to output the printed matter due to an inevitable reason, it is necessary to request another person to output the printed matter.

In such a case, the output of the printed matter should be permitted to a user (a user, etc. to which the output has been requested) other than the person himself/herself having inputted the print job. Japanese Unexamined Publication No. 2010-178285 discloses a system in which a person can output a printed matter when going to a place of an image forming apparatus and finishing authentication even though the person is not a person himself/herself having inputted a print job.

However, a printed matter may be left on a discharge tray of an image forming apparatus or may be distributed to a malicious third party, according to consciousness for information security of a user having received an output request of the printed matter. Therefore, even though an authentication procedure is imposed to a user who outputs some printed matters, a security level is reduced.

SUMMARY

The present invention is intended to solve the aforementioned problems in the prior art, and one of the objectives of the present invention is to provide a print management system, etc. capable of maintaining a security level without depending on only consciousness of an individual even when the output of a printed matter is permitted to a user other than a person himself/herself having inputted a print job.

To achieve at least one of the aforementioned objectives, a print management apparatus, reflecting one aspect of the present invention, comprises: a condition acquisition unit that acquires designated agent information for designating a plurality of agents capable of performing proxy printing based on a print job, and designated person number information for designating a number of agents who perform authentication in order to perform printing based on said print job; an authentication unit that inquires of said designated agent information about user identification information provided from a user intended to perform printing, and authenticates that said user is an agent designated by said designated agent information; and a print control unit that allows an image forming apparatus to perform said printing based on said print job when agents corresponding to said number designated by said designated person number information are authenticated by said authentication unit via same said image forming apparatus.

In said aforementioned print management apparatus, preferably, said condition acquisition unit further acquires proxy authority information for designating authority to be assigned to said agents; and said proxy authority information includes information for designating any one of authority for permitting proxy printing in units of print jobs and authority for collectively permitting proxy printing for all print jobs held by an inputter himself/herself.

In said aforementioned print management apparatus, preferably, said condition acquisition unit acquires a print job, and said designated agent information and said designated person number information designated for said print job.

In said aforementioned print management apparatus, preferably, after acquisition of a print job, said condition acquisition unit acquires said designated agent information and said designated person number information designated for said print job.

In said aforementioned print management apparatus, preferably, before acquisition of a print job, said condition acquisition unit acquires said designated agent information and said designated person number information designated for said print job.

In said aforementioned print management apparatus, preferably, in relation to said printing based on said print job, when agents corresponding to said number designated by said designated person number information are authenticated within a predetermined time after an first agent is authenticated by said authentication unit, said print control unit allows said image forming apparatus to perform said printing.

In said aforementioned print management apparatus, preferably, said print control unit changes a length of said predetermined time in response to said number designated by said designated person number information.

Preferably, said aforementioned print management apparatus further includes: a printing post-processing unit that inquires of authentication history about identification information provided again from all agents having been already authenticated after said printing by said image forming apparatus is completed, determines whether said all agents have been present to end of said printing, and outputs a result of said determination.

In said aforementioned print management apparatus, preferably, a process by said printing post-processing unit is omitted by a degree of importance of security or designation of an inputter himself/herself.

In said aforementioned print management apparatus, preferably, in relation to said printing based on said print job, said print control unit prevents information on said print job from being displayed on an image forming apparatus, other than an image forming apparatus to which an first agent has provided identification information for authentication.

In said aforementioned print management apparatus, preferably, in relation to said printing based on said print job, when an first agent has been authenticated by said authentication unit, said print control unit inputs said print job to said image forming apparatus, and starts said printing of said print job when said agents corresponding to said number designated by said designated person number information are authenticated.

In said aforementioned print management apparatus, preferably, a plurality of image forming apparatuses becoming a group are registered in advance, and said plurality of image forming apparatuses are managed as a group.

The objectives, features, and characteristics of this invention other than those set forth above will become apparent from the description given herein below with reference to preferred embodiments illustrated in the accompanying drawings.

BRIEF DESCRIPTION OF THE DRAWINGS

FIG. 11 is a diagram illustrating an example of a schematic data structure of candidate data.

FIG. 12 is a diagram illustrating an example of a schematic data structure of proxy condition data.

FIG. 13 is a diagram illustrating an example of a schematic data structure of proxy history data.

FIG. 17 is a diagram illustrating an example of a schematic data structure of authentication history data.

DETAILED DESCRIPTION

Figure 1:
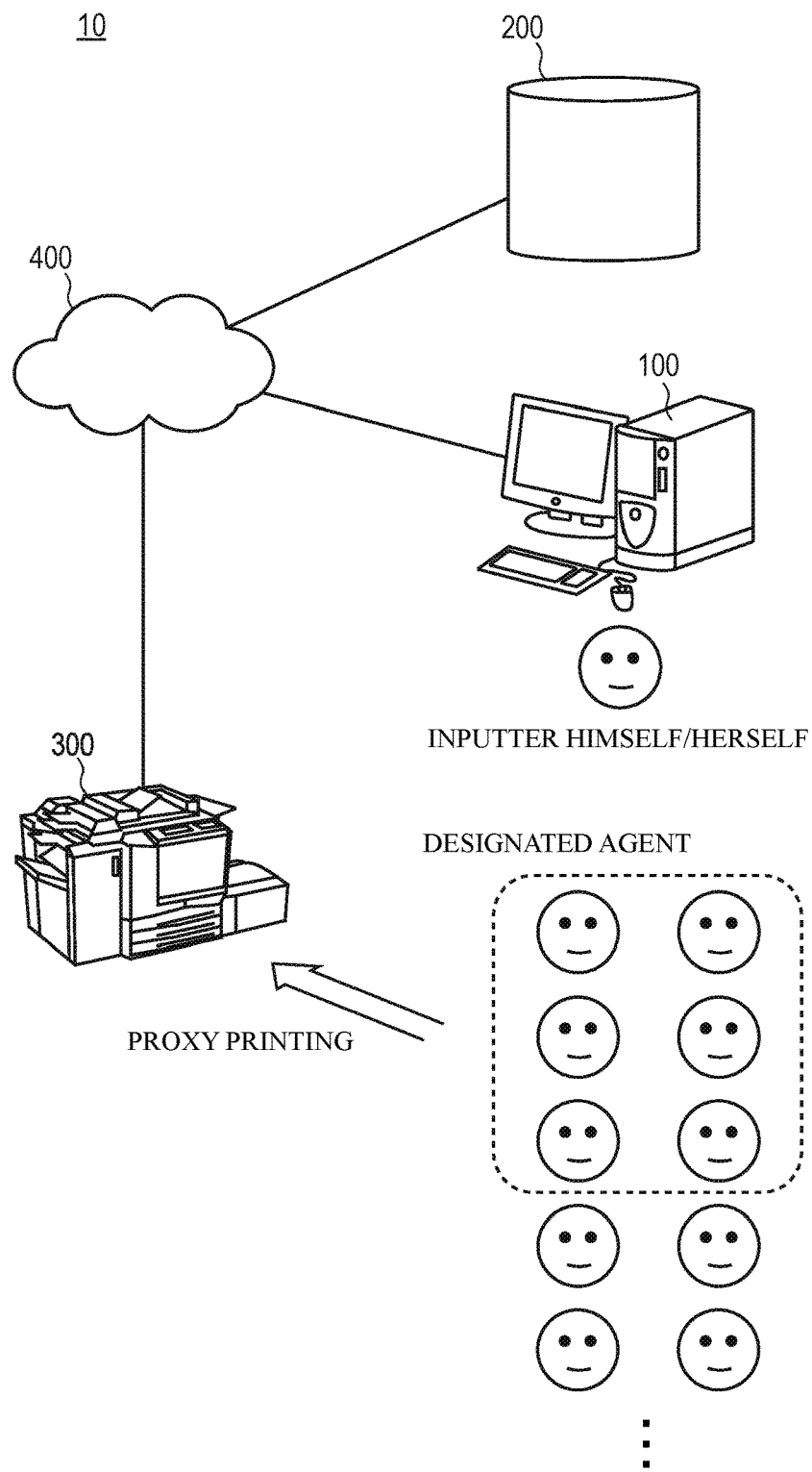
FIG. 1 is a schematic configuration diagram of a print management system.

The embodiments of this invention will be described below with reference to the accompanying drawings. In the description of the drawings, the same elements are denoted by the same reference numerals, and redundant description is omitted. In addition, in some cases, dimensional ratios in the drawings are exaggerated and different from actual ratios for convenience of the description.

<Print Management System 10 (Hardware Configuration)>

Figure 2:
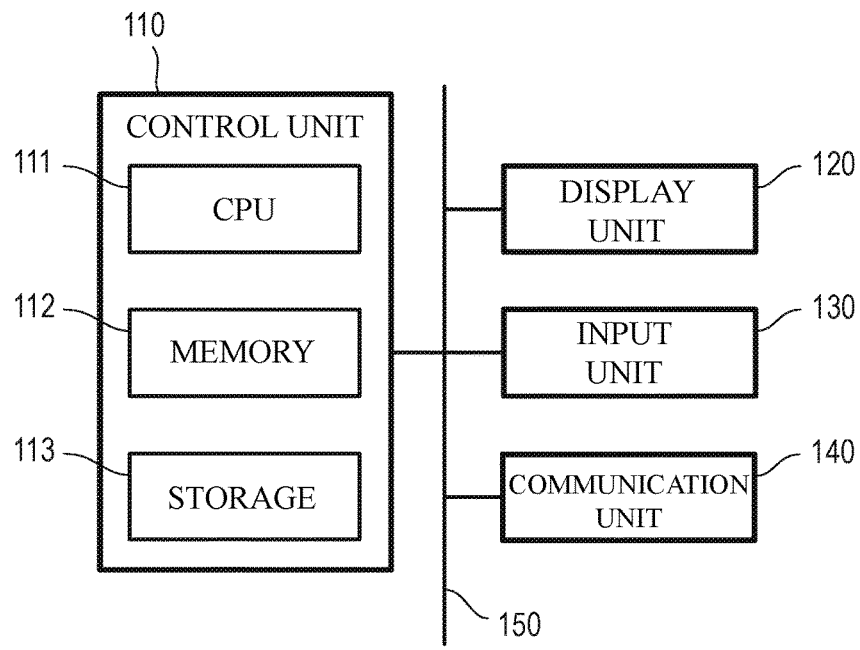
FIG. 2 is a block diagram illustrating a hardware configuration example of a job inputting apparatus.
Figure 3:
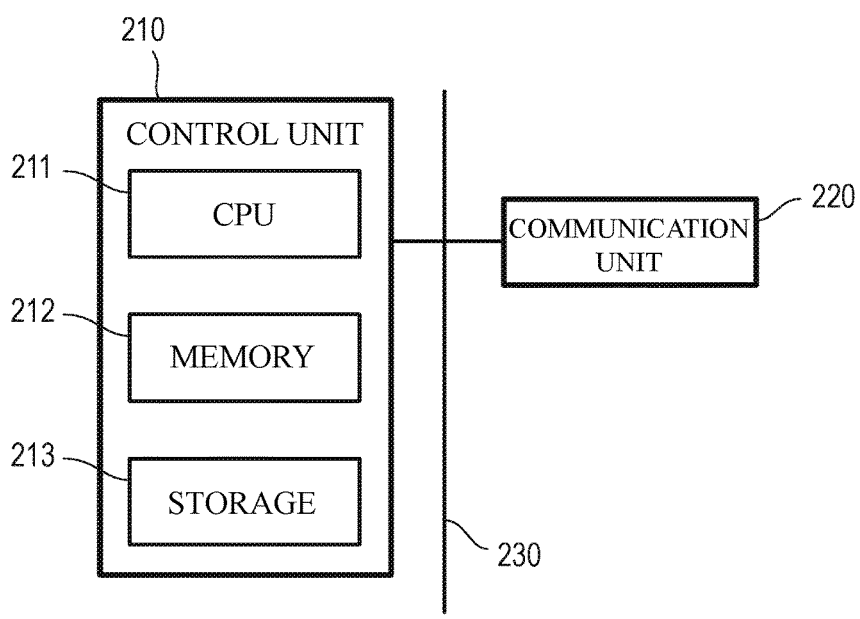
FIG. 3 is a block diagram illustrating a hardware configuration example of a print management apparatus.
Figure 4:
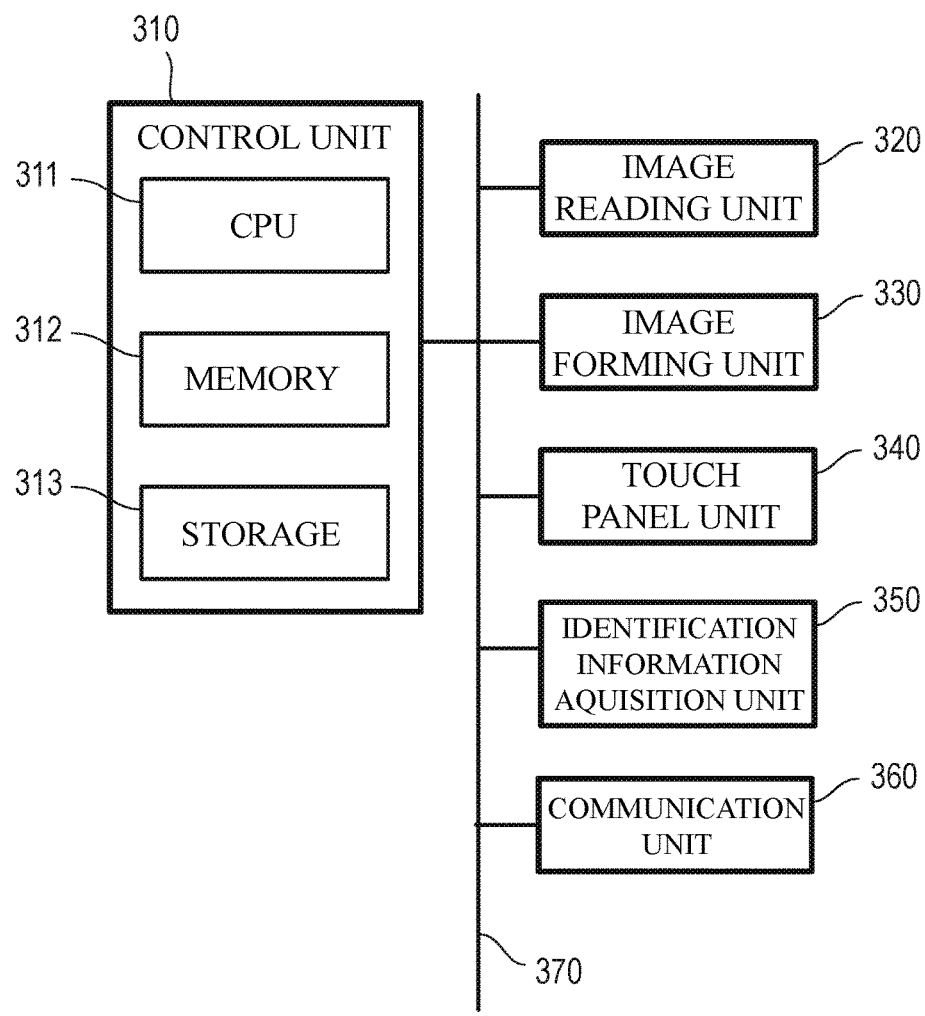
FIG. 4 is a block diagram illustrating a hardware configuration example of an image forming apparatus.

FIG. 1 is a schematic configuration diagram of a print management system. FIG. 2 is a block diagram illustrating a hardware configuration example of a job inputting apparatus. FIG. 3 is a block diagram illustrating a hardware configuration example of a print management apparatus. FIG. 4 is a block diagram illustrating a hardware configuration example of an image forming apparatus. Hereinafter, with reference to FIG. 1 to FIG. 4, a schematic configuration of a print management system 10, particularly, a hardware configuration will be described.

(1) Overall Configuration

As shown in FIG. 1, the print management system 10 includes a job inputting apparatus 100, a print management apparatus 200, and an image forming apparatus 300. The apparatuses 100, 200, and 300 are communicably connected to one another via a computer network (hereinafter, simply referred to as a "network 400") such as LAN (Local Area Network).

A print job inputted from the job inputting apparatus 100 is temporarily stored in the print management apparatus 200 via the network 400. Then, the print job stored in the print management apparatus 200 is transferred to the image forming apparatus 300 and is output as a printed matter. At this time, in order to enhance a security level, even though a person is a person himself/herself having inputted a print job (hereinafter, referred to as an "inputter himself/herself"), it is not normally possible to output a printed matter until the person goes to a place of the image forming apparatus 300 and provides identification information for authenticating that the person is an inputter himself/herself.

However, when the inputter himself/herself does not go to the image forming apparatus 300 in order to output a printed matter due to an inevitable reason, it is also possible to request another person to output the printed matter (proxy printing). In this case, instead of the inputter himself/herself, when a plurality of designated persons (hereinafter, referred to as "designated agents") go to the place of the same image forming apparatus 300 and provide their own identification information, it is possible to output the printed matter.

In addition, the type and number of apparatuses constituting the print management system 10 are not limited to the example illustrated in FIG. 1. Hereinafter, the print management system 10 will be described as a system including a plurality of job inputting apparatuses 100 and a plurality of image forming apparatuses 300. Furthermore, when a "user" is simply mentioned, it is assumed to include both the inputter himself/herself and the designated agent.

(2) Job Inputting Apparatus 100 (Hardware Configuration)

The job inputting apparatus 100 is a computer that inputs a print job which can be printed in the image forming apparatus 300. In the job inputting apparatus 100, a printer driver has been installed.

According to a detailed hardware configuration, as illustrated in FIG. 2, the job inputting apparatus 100 has a control unit 110, a display unit 120, an input unit 130, and a communication unit 140, wherein these are connected to one another via a signal line (a bus, etc.) 150 for exchanging signals.

The control unit 110 controls the whole of the job inputting apparatus 100. For example, the control unit 110 has a CPU 111, a memory 112, and a storage 113.

The CPU 111 is a control circuit configured by a multicore processor, etc., which perform control of the aforementioned each element and various types of processes according to a program, and each function of the job inputting apparatus 100 is performed when the CPU 111 executes programs corresponding to the functions.

The memory 112 is a work area and is a high speed accessible main storage device that temporarily stores programs and data. The memory 112, for example, employs DRAM (Dynamic Random Access Memory), SDRAM (Synchronous Dynamic Random Access Memory), SRAM (Static Random Access Memory), etc.

The storage 113 is an auxiliary storage device with a large capacity, which stores various programs including an operating system and various types of data. The storage 113, for example, employs a hard disk, a solid state drive, a flash memory, ROM, etc.

The display unit 120 displays information, setting information, etc., which are necessary for operating the job inputting apparatus 100, and various types of data. The display unit 120, for example, employs a liquid crystal display, an organic EL (Electro-Luminescence), etc.

The input unit 130 inputs various types of data according to an instruction of the inputter himself/herself. The input unit 130, for example, employs a pointing device such as a keyboard and a mouse.

The communication unit 140 is an interface for communicating with an external apparatus (for example, the print management apparatus 200, the image forming apparatus 300, etc.) via the network 400.

(3) Print Management Apparatus 200

The print management apparatus 200 is a server that manages a group of (a plurality of) image forming apparatuses 300 connected to the network 400. The group of image forming apparatuses 300 managed by the print management apparatus 200 have been registered in the print management apparatus 200 in advance.

According to a detailed hardware configuration, as illustrated in FIG. 3, the print management apparatus 200 has a control unit 210 and a communication unit 220, wherein these are connected to each other via a signal line (a bus, etc.) 230 for exchanging signals.

The control unit 210 controls the whole of the print management apparatus 200. For example, the control unit 210 has a CPU 211, a memory 212, and a storage 213. Since the CPU 211, the memory 212, and the storage 213 can be implemented by configurations similarly to those of the job inputting apparatus 100, a description thereof will be omitted.

The communication unit 220 is an interface for communicating with an external apparatus (for example, the job inputting apparatus 100, the image forming apparatus 300, etc.) via the network 400.

(4) Image Forming Apparatus 300

The image forming apparatus 300 is a printer, a multifunctional peripheral (MFP), etc., which have at least a print function. For example, the image forming apparatus 300 performs printing based on a print job transmitted from the print management apparatus 200.

According to a detailed hardware configuration, as illustrated in FIG. 4, the image forming apparatus 300 has a control unit 310, an image reading unit 320, an image forming unit 330, a touch panel unit 340, an identification information acquisition unit 350, and a communication unit 360. These units 310, 320, 330, 340, 350, and 360 are connected to one another via a signal line 370 for exchanging signals.

The control unit 310 controls the whole of the image forming apparatus 300. For example, the control unit 310 has a CPU 311, a memory 312, and a storage 313. Since the CPU 311, the memory 312, and the storage 313 can be implemented by configurations similarly to those of the job inputting apparatus 100 or the print management apparatus 200, a description thereof will be omitted.

The image reading unit 320 irradiates light from a light source, such as a fluorescent lamp, to a document set at a predetermined reading position of a document platen or a document transmitted at a predetermined reading position by ADF (Auto Document Feeder). The image reading unit 320 scans reflected light of the light by a light receiving element such as a CCD image sensor and a CMOS image sensor, thereby generating digital data of a document image.

The image forming unit 330 prints image data for printing on a recording paper supplied from a paper feeding tray, etc., by an electrophotographic image forming process. However, image forming schemes employed by the image forming unit 330 may be other schemes such as an impact scheme, a thermal transfer scheme, an ink jet scheme, etc. The recording paper (a printed matter) printed by the image forming unit 330 is output to a paper discharge tray, etc.

The touch panel unit 340 is configured by a display unit (not illustrated) such as a display and a transmissive operating panel adhered to a display surface side of the display unit. The touch panel unit 340 specifies a touch position corresponding to an XY coordinate of an image displayed on the display unit, converts the touch position into a coordinate, and outputs the coordinate. In addition, the touch panel unit 340 is configured by a resistive or capacitive input detection element, etc.

The identification information acquisition unit 350 acquires identification information provided from an electronic appliance (including an IC card, a cellular phone, a smart phone, etc.) carried by the inputter himself/herself or the designated agent. For example, the identification information acquisition unit 350 is configured by a card reader, etc., which satisfies a near field communication (NFC) standard, etc. In addition, the identification information may be generated from the characteristics (a fingerprint, a retina, etc.) of the human body of the inputter himself/herself or the designated agent without using the electronic appliance.

The communication unit 360 is an interface for communicating with an external apparatus (for example, the job inputting apparatus 100, the print management apparatus 200, etc.) via the network 400.

<Print Management System 10 (Functional Configuration)>

Figure 5:
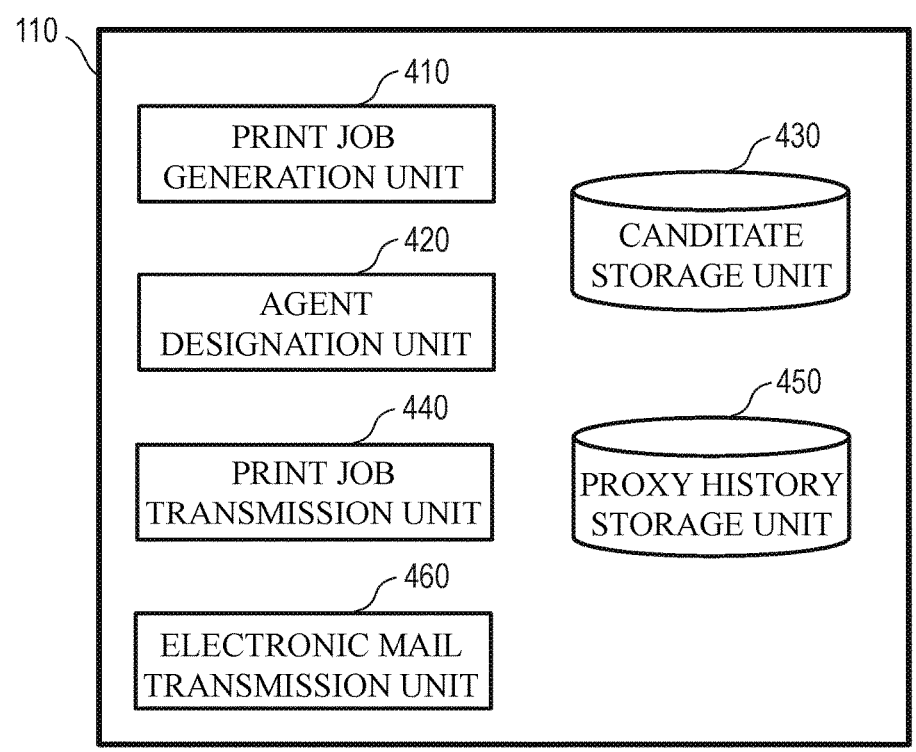
FIG. 5 is a block diagram illustrating a functional configuration example of a job inputting apparatus.
Figure 6:
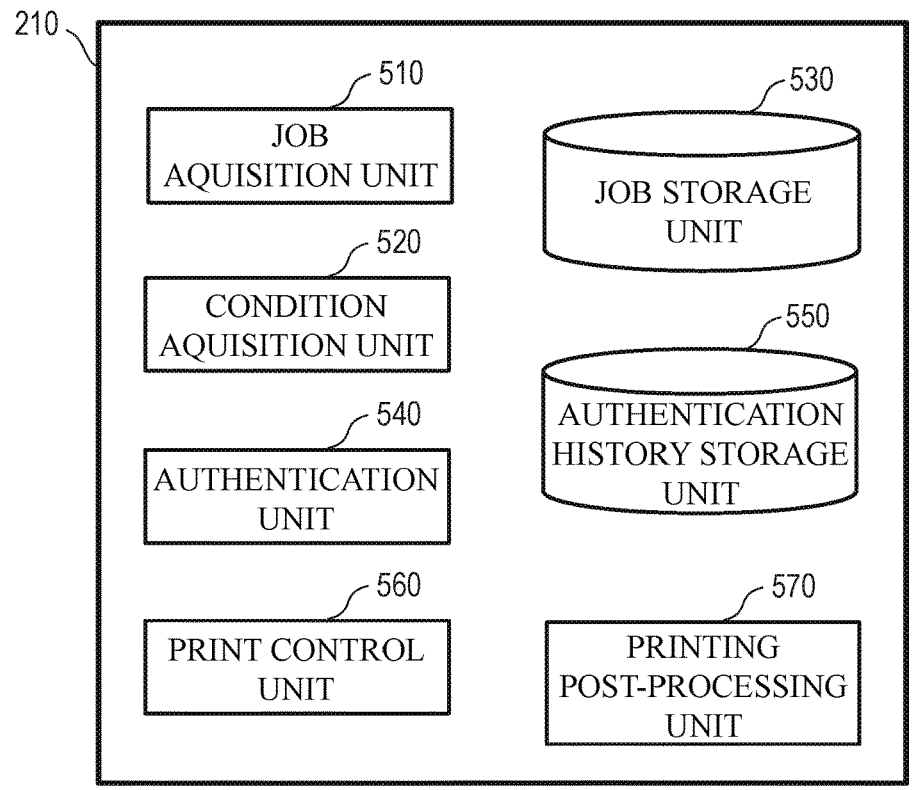
FIG. 6 is a block diagram illustrating a functional configuration example of a print management apparatus.
Figure 7:
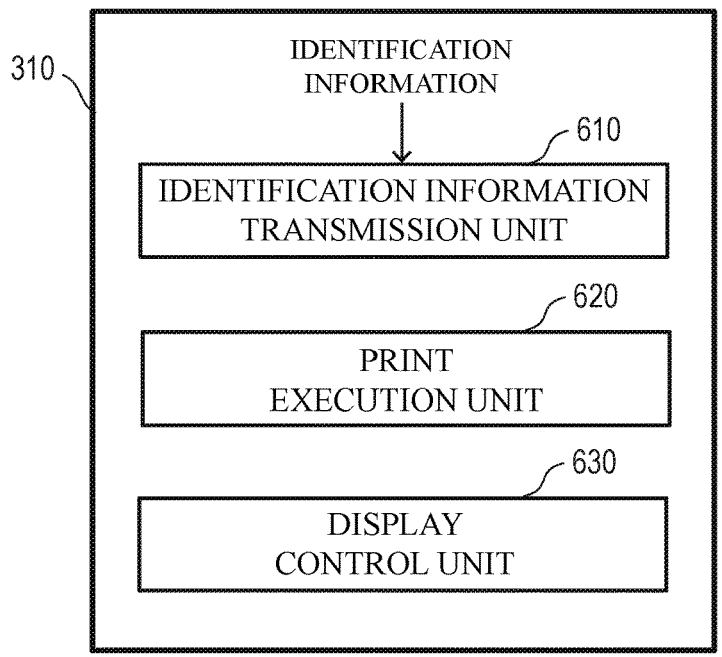
FIG. 7 is a block diagram illustrating a functional configuration example of an image forming apparatus.

The job inputting apparatus 100, the print management apparatus 200, and the image forming apparatus 300 having the aforementioned hardware configurations respectively have functional configurations as illustrated in FIG. 5 to FIG. 7.

(1) Job Inputting Apparatus 100 (Functional Configuration)

FIG. 5 is a block diagram illustrating the functional configuration example of the job inputting apparatus 100. As illustrated in FIG. 5, the control unit 110 of the job inputting apparatus 100 has a print job generation unit 410, an agent designation unit 420, a candidate storage unit 430, a print job transmission unit 440, a proxy history storage unit 450, and an electronic mail transmission unit 460.

The print job generation unit 410 converts a document file, etc., into PDL data, which has been described by PDL (Page Description Language), on the basis of print setting set in the job inputting apparatus 100.

The agent designation unit 420 designates a plurality of agents (designated agents) capable of performing proxy printing based on a print job from among a plurality of candidates. The agent designation unit 420 designates the number of designated agents to be authenticated for the execution of printing (the output of a printed matter) based on the print job. The agent designation unit 420 designates authority to be assigned to the designated agents. The authority to be assigned to the designated agents includes authority for permitting proxy printing in units of print jobs, authority for collectively permitting proxy printing for all print jobs held by the inputter himself/herself, etc. In addition, the designation by the agent designation unit 420 is performed on the basis of an instruction of the inputter himself/herself.

The candidate storage unit 430 stores data (hereinafter, referred to as "candidate data") regarding candidates of the designated agent. For example, the candidate storage unit 430 associates names, individual IDs, and mail addresses of candidates with one another for storage.

The print job transmission unit 440 transmits the print job generated by the print job generation unit 410 to the print management apparatus 200. Furthermore, the print job transmission unit 440 transmits conditions (hereinafter, referred to as "proxy conditions") of the designated agent, which are set for the print job, to the print management apparatus 200 as proxy condition data. In addition, the proxy condition data includes "agent designation information" indicating an individual ID of the designated agent, "person number designation information" indicating the number of designated agents to be authenticated, and "proxy authority information" indicating authority assigned to the designated agent.

The proxy history storage unit 450 stores, as proxy history data, proxy conditions when an agent has been designated in the past printing. For example, the proxy history storage unit 450 associates the agent designation information, the person number designation information, and the proxy authority information of the designated agent with one another for storage.

The electronic mail transmission unit 460 selects a mail address of the designated agent as a destination, and transmits an electronic mail for notifying that the designated agent has been designated as an agent.

In addition, the print job generation unit 410, the agent designation unit 420, the print job transmission unit 440, and the electronic mail transmission unit 460 are respectively realized when the CPU 111 reads the program installed in the storage 113 to the memory 112 and executes the program. However, the present invention is not limited thereto, and they may be realized by hardware such as ASIC. Furthermore, the candidate storage unit 430 and the proxy history storage unit 450 are respectively realized by the storage 113 or the memory 112.

(2) Print Management Apparatus 200 (Functional Configuration)

FIG. 6 is a block diagram illustrating the functional configuration example of the print management apparatus 200. As illustrated in FIG. 6, the control unit 210 of the print management apparatus 200 has a job acquisition unit 510, a condition acquisition unit 520, a job storage unit 530, an authentication unit 540, an authentication history storage unit 550, a print control unit 560, and a printing post-processing unit 570.

The job acquisition unit 510 acquires the print job inputted from the job inputting apparatus 100.

The condition acquisition unit 520 acquires the proxy conditions of the designated agent, which have been set for the print job inputted from the job inputting apparatus 100, that is, the agent designation information, the person number designation information, and the proxy authority information.

The job storage unit 530 stores the print job inputted from the job inputting apparatus 100.

The authentication unit 540 inquires of the agent designation information acquired by the condition acquisition unit 520 about identification information, which has been provided from a user intended to perform printing (to output a printed matter), and authenticates that the user is a designated agent designated by the agent designation information.

The authentication history storage unit 550 stores an individual ID of a designated agent, who has completed authentication (limited to the case of success of the authentication), and an authentication time thereof as authentication history data.

The print control unit 560 allows the image forming apparatus 300 to perform printing based on the print job inputted from the job inputting apparatus 100. For example, for a print job for proxy printing, the print control unit 560 allows printing to be performed when designated agents corresponding to the number of persons designated by the person number designation information have completed authentication by the authentication unit 540 via the same image forming apparatus 300.

The printing post-processing unit 570 inquires of the authentication history data about identification information, which has been provided again from all designated agents who have already finished authentication, and determines whether these designated agents have been present to the end of printing, after the printing by the image forming apparatus 300 is ended. Furthermore, the printing post-processing unit 570 notifies the inputter himself/herself of the print job of a result of the determination.

In addition, the job acquisition unit 510, the condition acquisition unit 520, the authentication unit 540, the print control unit 560, and the printing post-processing unit 570 are respectively realized when the CPU 211 reads the program installed in the storage 213 to the memory 212 and executes the program. However, the present invention is not limited thereto, and they may be realized by hardware such as ASIC. Furthermore, the job storage unit 530 and the authentication history storage unit 550 are respectively realized by the storage 213 or the memory 212.

(3) Image Forming Apparatus 300 (Functional Configuration)

FIG. 7 is a block diagram illustrating the functional configuration example of the image forming apparatus 300. As illustrated in FIG. 7, the control unit 310 of the image forming apparatus 300 has an identification information transmission unit 610, a print execution unit 620, and a display control unit 630.

The identification information transmission unit 610 transmits the identification information, which has been provided from the user intended to perform the printing (to output the printed matter), to the print management apparatus 200. The identification information is acquired by the aforementioned identification information acquisition unit 350.

The print execution unit 620 performs printing based on the print job transmitted from the print management apparatus 200, and outputs the printed matter.

The display control unit 630 allows the display unit of the touch panel unit 340 to display various setting screens, various messages, etc. For example, the display control unit 630 can allows a screen, etc., for confirming proxy printing or printing other than the proxy printing to be displayed with respect to the user intended to perform the printing.

In addition, the identification information transmission unit 610 and the display control unit 630 are respectively realized when the CPU 311 reads the program installed in the storage 313 to the memory 312 and executes the program. Furthermore, the print execution unit 620 is realized when the CPU 311 reads the program installed in the storage 313 to the memory 312 and executes the program, and controls the image forming unit 330, etc. However, the present invention is not limited thereto, and they may be realized by hardware such as ASIC.

<Operation of Print Management System 10>

Next, characteristic operations of the print management system 10 according to the present embodiment will be described.

(1) Job Inputting Process

Figure 8:
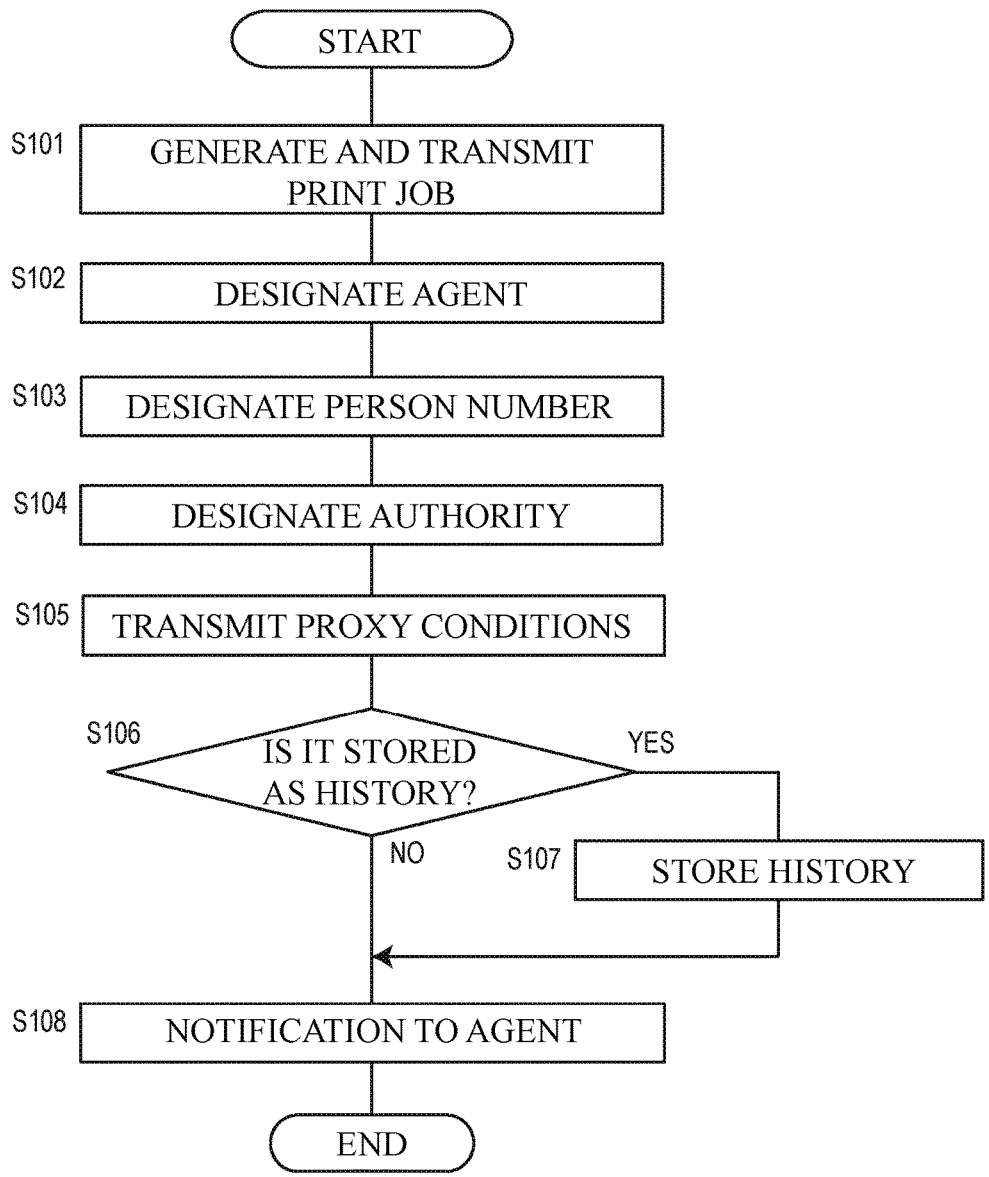
FIG. 8 is a flowchart of a job inputting process.

FIG. 8 is a flowchart of the job inputting process. In addition, the job inputting process is performed in the job inputting apparatus 100.

Figure 9:
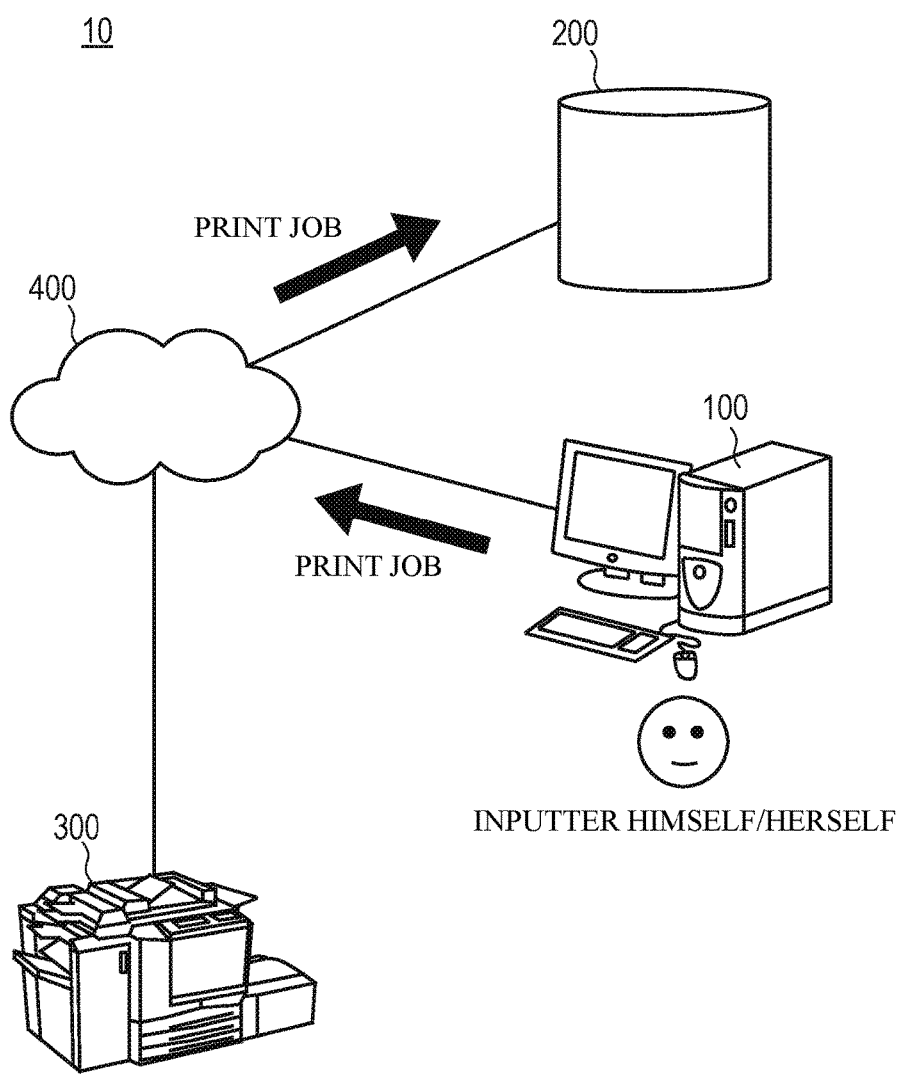
FIG. 9 is a diagram for explaining an operation when a print job is transmitted.
Figure 10:
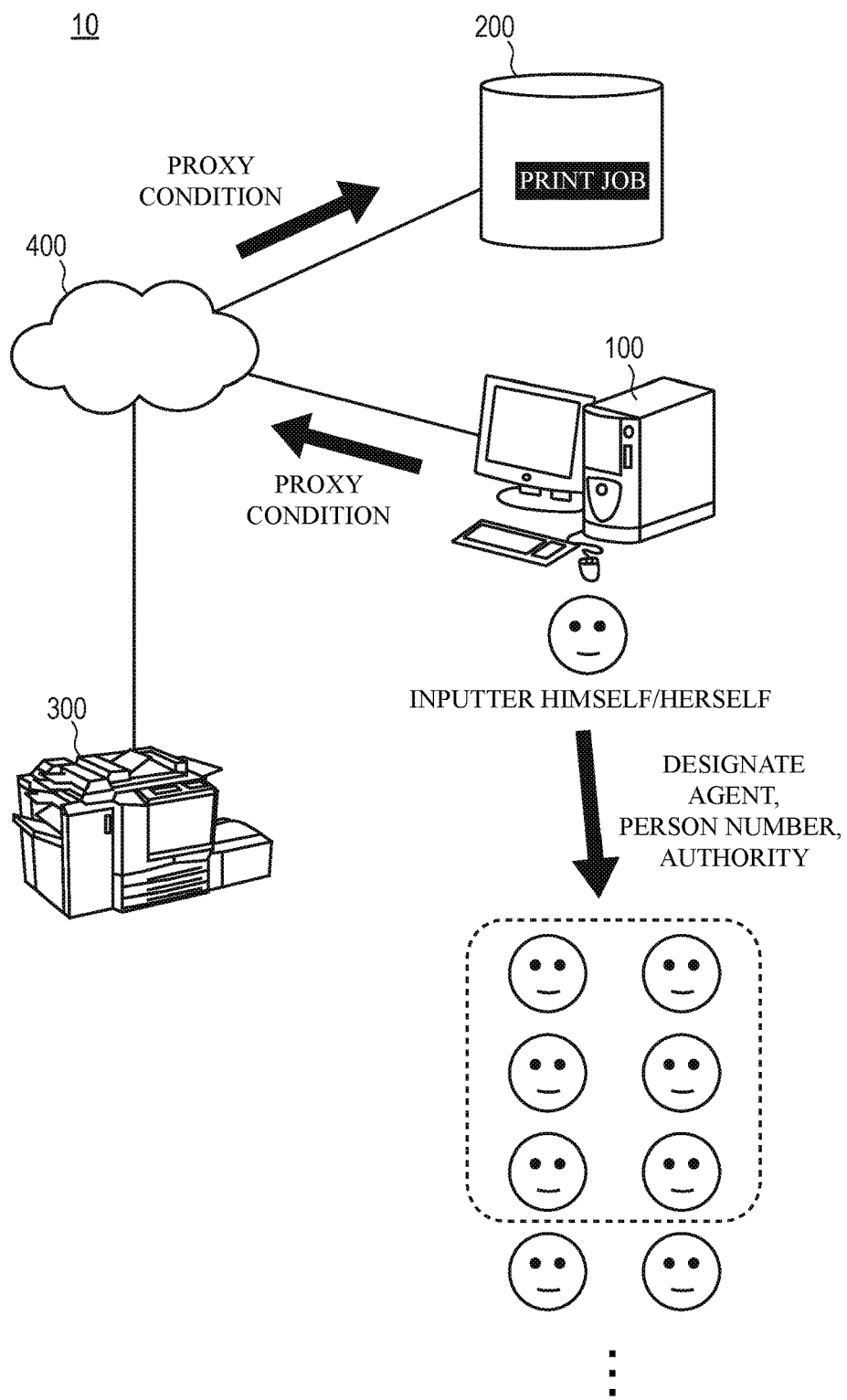
FIG. 10 is a diagram for explaining an operation when proxy condition data is transmitted.

Furthermore, FIG. 9 is a diagram for explaining an operation when the print job is transmitted. FIG. 10 is a diagram for explaining an operation when the proxy condition data is transmitted. FIG. 11 is a diagram illustrating an example of a schematic data structure of the candidate data. FIG. 12 is a diagram illustrating an example of a schematic data structure of the proxy condition data. FIG. 13 is a diagram illustrating an example of a schematic data structure of the proxy history data.

Hereinafter, with reference to FIG. 8 to FIG. 13, the procedure of the job inputting process will be described.

The control unit 110 of the job inputting apparatus 100 starts the job inputting process when a printing instruction for a document file, etc., has been received by the input unit 130.

(Step S101)

When the job inputting process starts, the control unit 110 serves as the print job generation unit 410, converts a document file, etc., to be printed into PDL data, and generates a print job. Furthermore, the control unit 110 serves as the print job transmission unit 440 and transmits the generated print job to the print management apparatus 200 via the network 400.

At this time, as indicated by a black arrow of FIG. 9, the print job is transmitted to the print management apparatus 200 from the job inputting apparatus 100 and is temporarily stored in the job storage unit 530 of the print management apparatus 200.

(Step S102)

Returning to FIG. 8, the control unit 110 serves as the agent designation unit 420, and designates agents (candidates within a broken line frame illustrated in FIG. 10), who output a printed matter instead of an inputter himself/herself, as designated agents in relation to the print job generated and transmitted in step S101. For example, the control unit 110 displays a predetermined screen on the display unit 120, and receives an instruction for selecting agents from a plurality of candidates from the input unit 130. At this time, the control unit 110 may read candidate data as illustrated in FIG. 11 from the candidate storage unit 430, display a list of names, individual IDs, and mail addresses of the candidates on the display unit 120, and allow the inputter himself/herself to select candidates. Furthermore, the inputter himself/herself may also search for desired candidates by employing information on at least one of the names, the individual IDs, and the mail addresses as a key.

When the designated agents are designated, the control unit 110 stores the individual IDs of the designated agents as designated agent information.

(Step S103)

Returning to FIG. 8, the control unit 110 serves as the agent designation unit 420, and designates the number of designated agents requested to be authenticated when the designated agents output the printed matter. For example, the control unit 110 receives an instruction, from the input unit 130, for inputting the number of designated agents requested to be authenticated on the screen displayed on the display unit 120 in step S102.

When the number of designated agents requested to be authenticated is designated, the control unit 110 stores the number of designated agents as designated person number information.

(Step S104)

The control unit 110 serves as the agent designation unit 420 and designates authority to be assigned to the designated agents. For example, the control unit 110 receives an instruction, from the input unit 130, for selecting any one of authority for permitting proxy printing in units of print jobs and authority for collectively permitting proxy printing for all print jobs held by the inputter himself/herself.

When the authority to be assigned to the designated agents is designated, the control unit 110 stores the authority as proxy authority information.

(Step S105)

The control unit 110 serves as the print job transmission unit 440, and transmits proxy condition data as illustrated in FIG. 12 to the print management apparatus 200. In the example illustrated in FIG. 12, the proxy condition data includes identification information (a job ID) of the print job generated and transmitted in step S101 and an individual ID (an inputter ID) of the inputter himself/herself. In addition, the proxy condition data includes the designated agent information generated in step S102, the designated person number information generated in step S103, and the proxy authority information generated in step S104.

As indicated by a black arrow of FIG. 10, the proxy condition data is transmitted to the print management apparatus 200 from the job inputting apparatus 100 and is temporarily stored in the job storage unit 530 of the print management apparatus 200.

(Step S106)

Returning to FIG. 8, the control unit 110 determines whether to store the proxy conditions designated in steps S102 to S104 as history. For example, when an instruction for storing the proxy conditions as history is received from the input unit 130 (step S106: YES), the control unit 110 allows the procedure to proceed to step S107. On the other hand, when an instruction (for example, an instruction terminating the print) different from the instruction for storing the proxy conditions as history is received (step S106: NO), the control unit 110 allows the procedure to proceed to step S108. Even though the instruction different from the instruction for storing the proxy conditions as history is not received, after a predetermined time lapses, the procedure may automatically proceed to step S108.

(Step S107)

The control unit 110 stores the proxy conditions designated in steps S102 to S104 as history. For example, as illustrated in FIG. 13, the control unit 110 stores the proxy condition data, which has been transmitted to the print management apparatus 200 in step S105, in the proxy history storage unit 450 as proxy history data as is. In this way, afterward, a set of proxy conditions (the designated agent information, the designated person number information, and the proxy authority information) included in the proxy history data can be displayed on the display unit 120 so as to be collectively selectable, and a designation operation for the proxy conditions becomes easy.

(Step S108)

Figure 14:
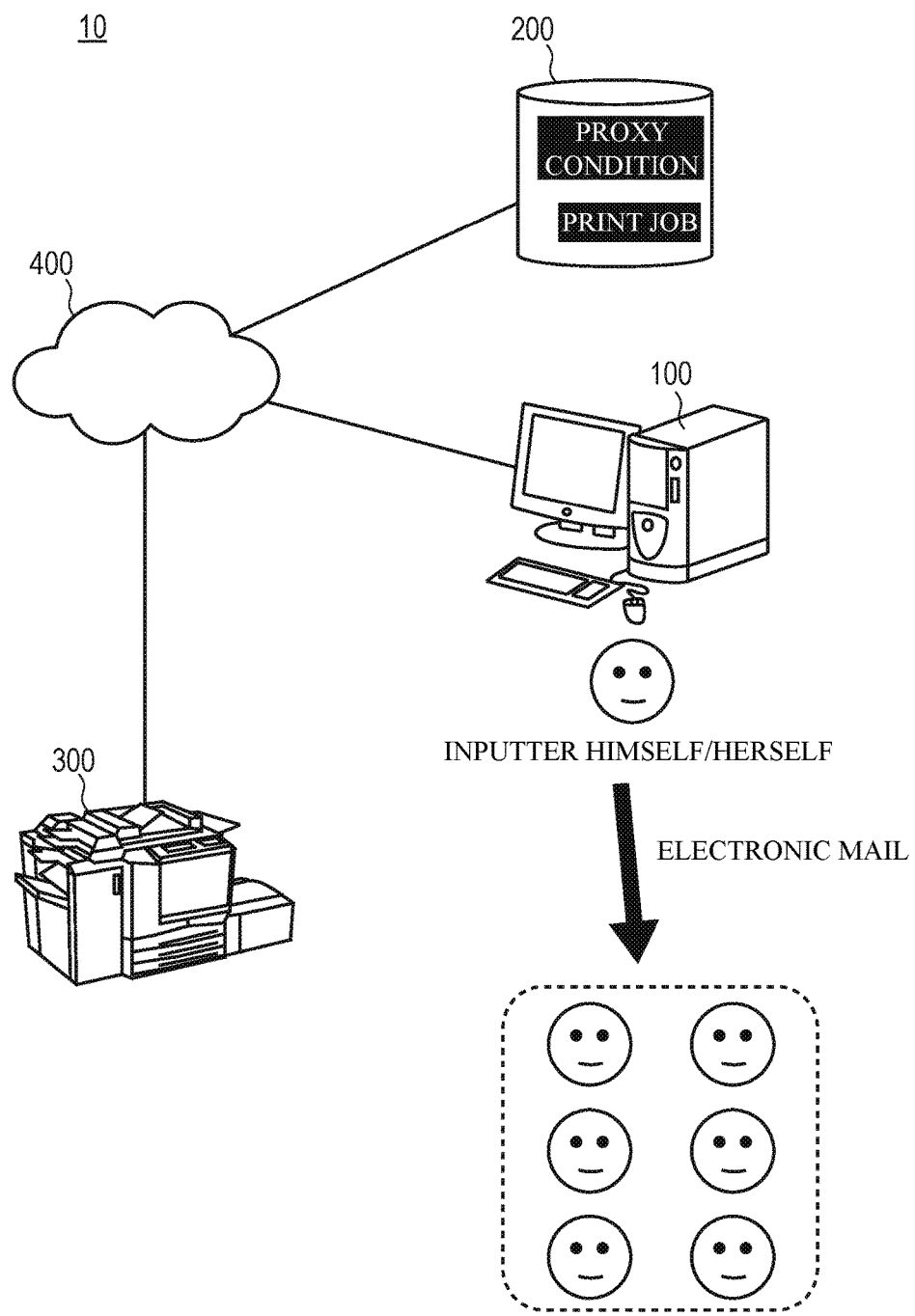
FIG. 14 is a diagram for explaining an operation when an electronic mail is transmitted to an agent.

The control unit 110 serves as the electronic mail transmission unit 460, and transmits an electronic mail for notifying that agents have been designated by selecting the mail addresses of the designated agents as a destination (FIG. 14). In addition, it is sufficient if the mail addresses of the designated agents are obtained by extracting mail addresses associated with individual IDs of the designated agents from the candidate data (FIG. 11).

When the process of step S108 is ended, the control unit 110 ends the job inputting process.

The aforementioned job inputting process is performed, so that it is possible to input a print job to the print management system 10 and to designate proxy conditions when setting designated agents for the print job.

(2) Proxy Printing Process

Figure 15:
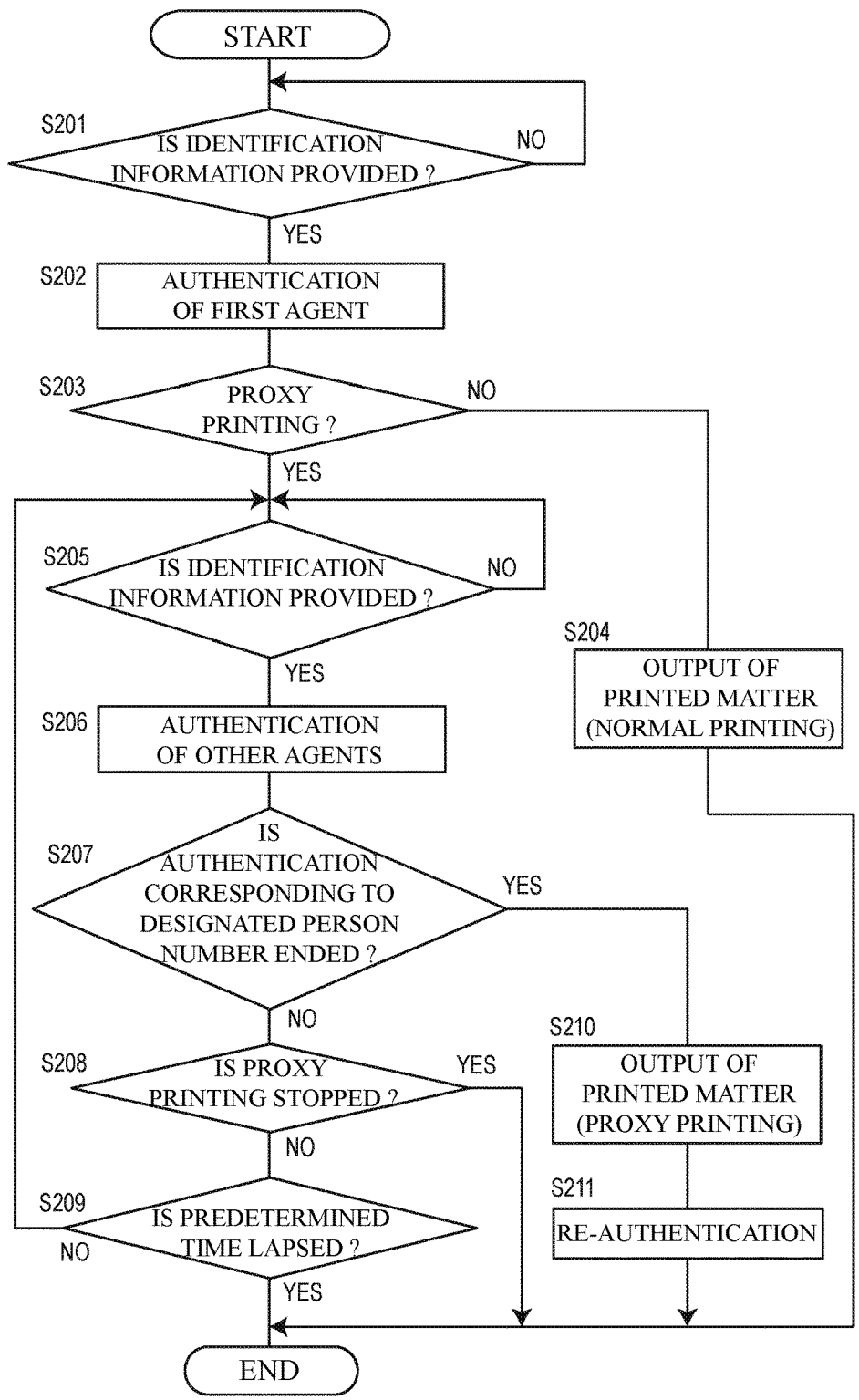
FIG. 15 is a flowchart of a proxy printing process.

FIG. 15 is a flowchart of the proxy printing process. In addition, the proxy printing process is performed in print management apparatus 200.

Figure 16:
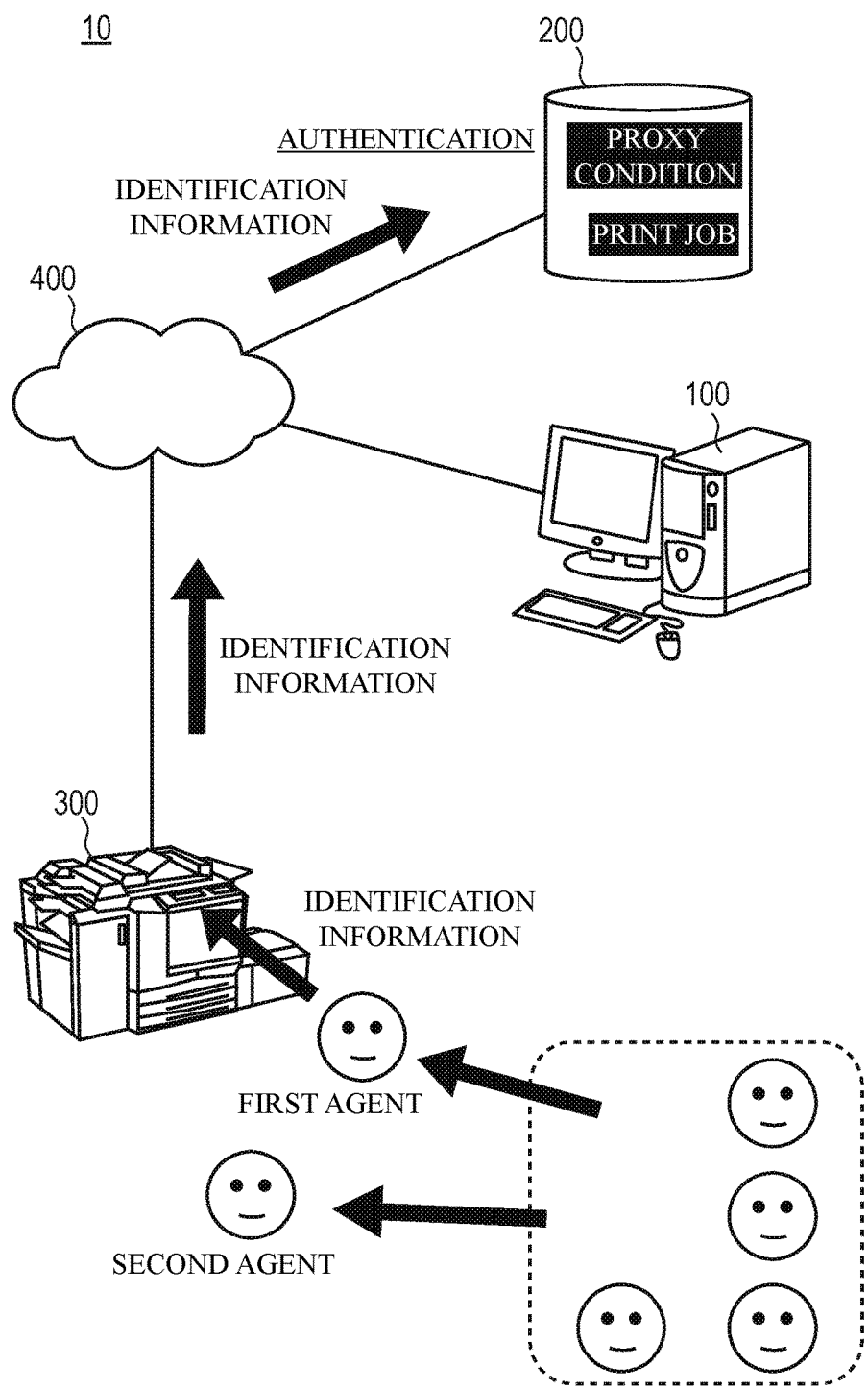
FIG. 16 is a diagram for explaining an operation when a first agent performs authentication.
Figure 18:
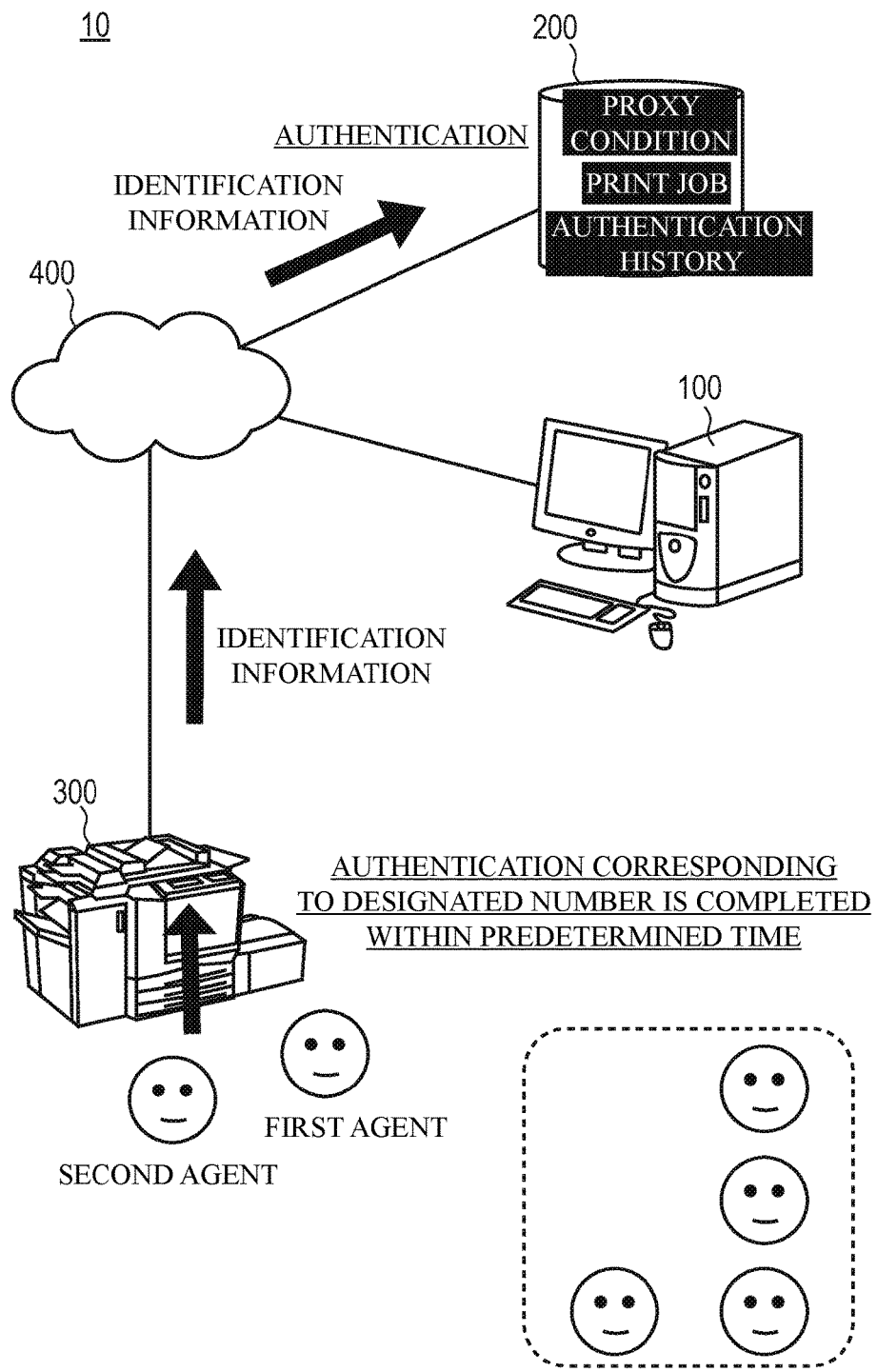
FIG. 18 is a diagram for explaining an operation when a second agent performs authentication.
Figure 19:
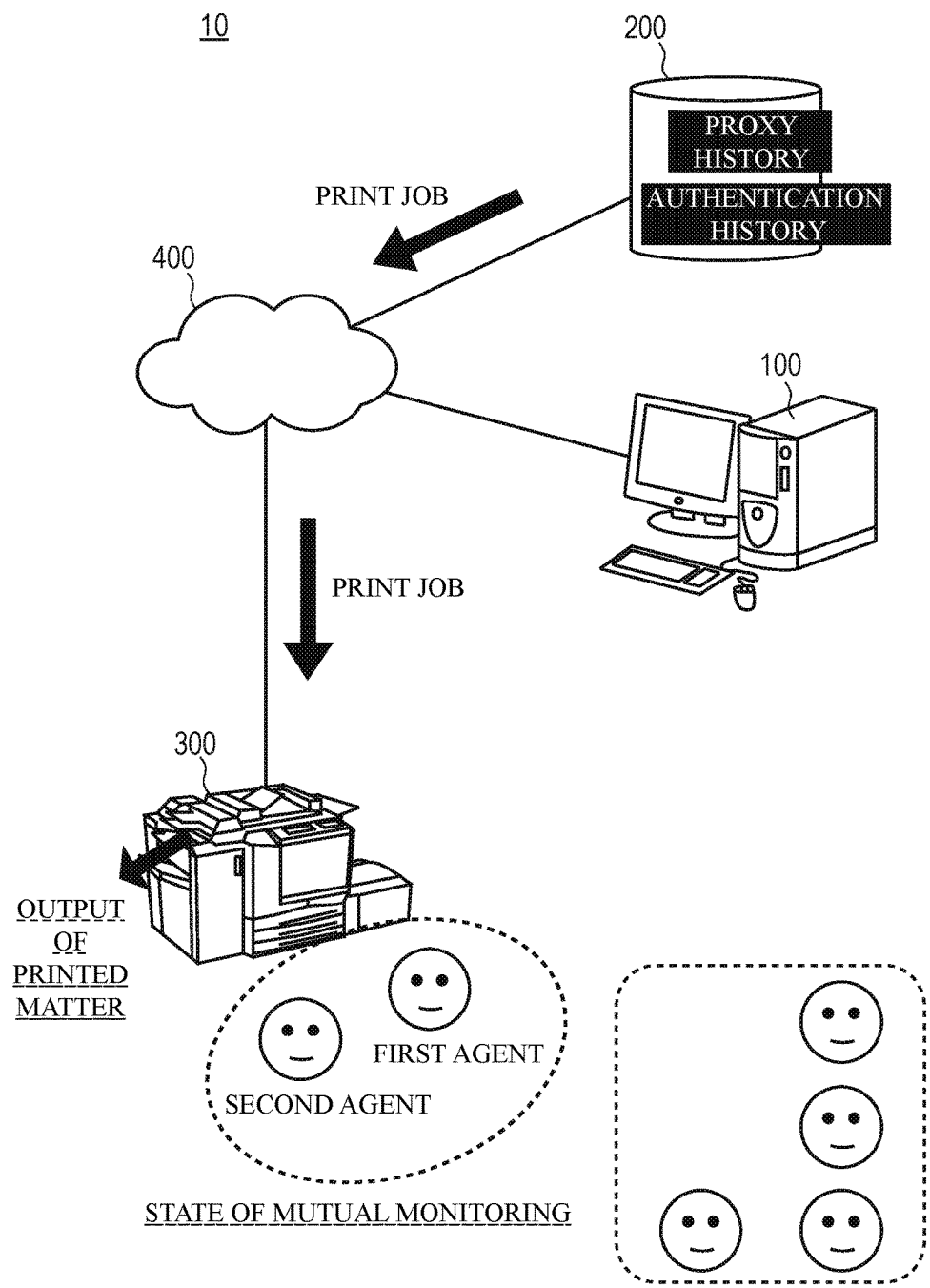
FIG. 19 is a diagram for explaining an operation when a printed matter is output.
Figure 20:
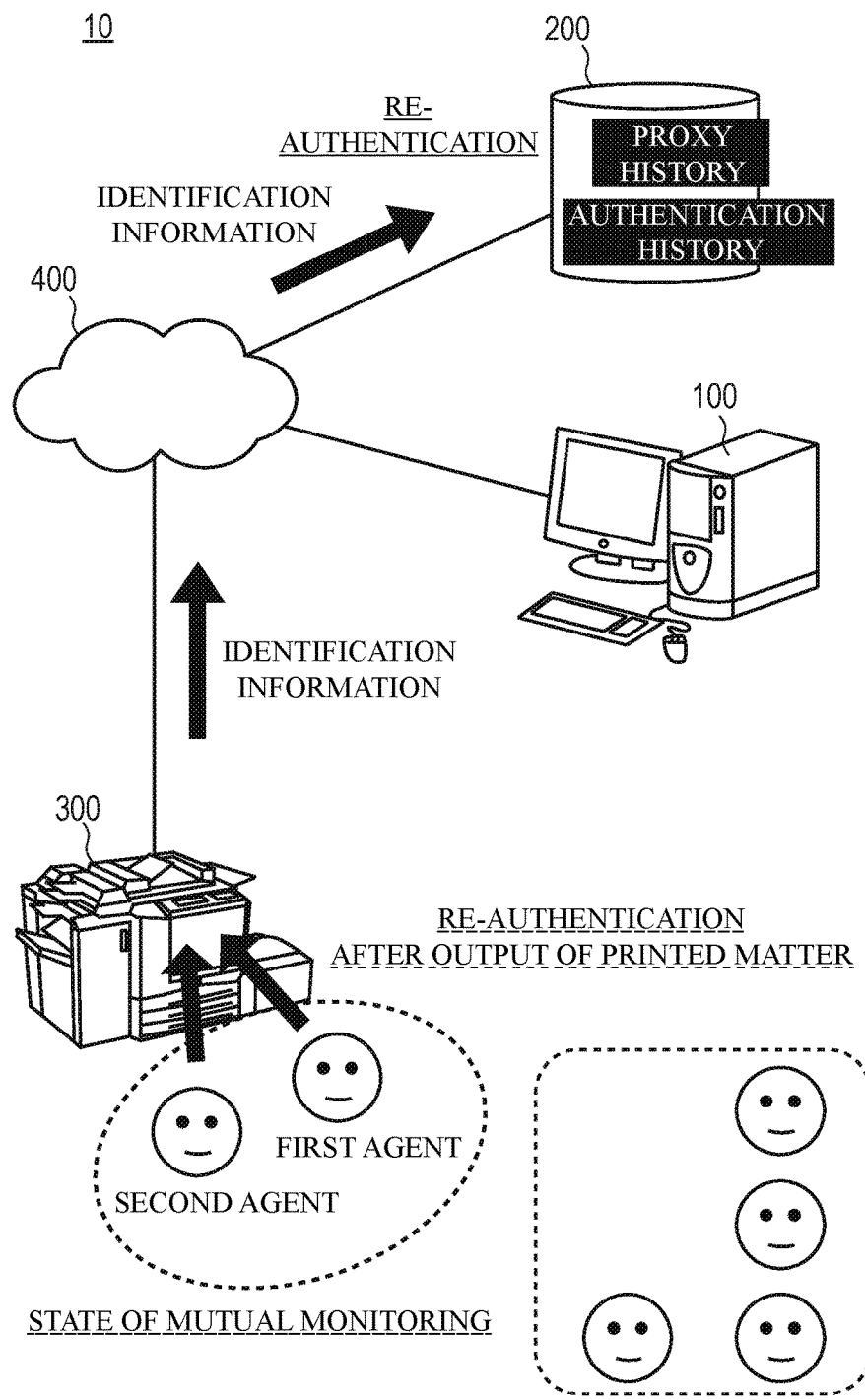
FIG. 20 is a diagram for explaining an operation when re-authentication is performed after the output of a printed matter.
Figure 21:
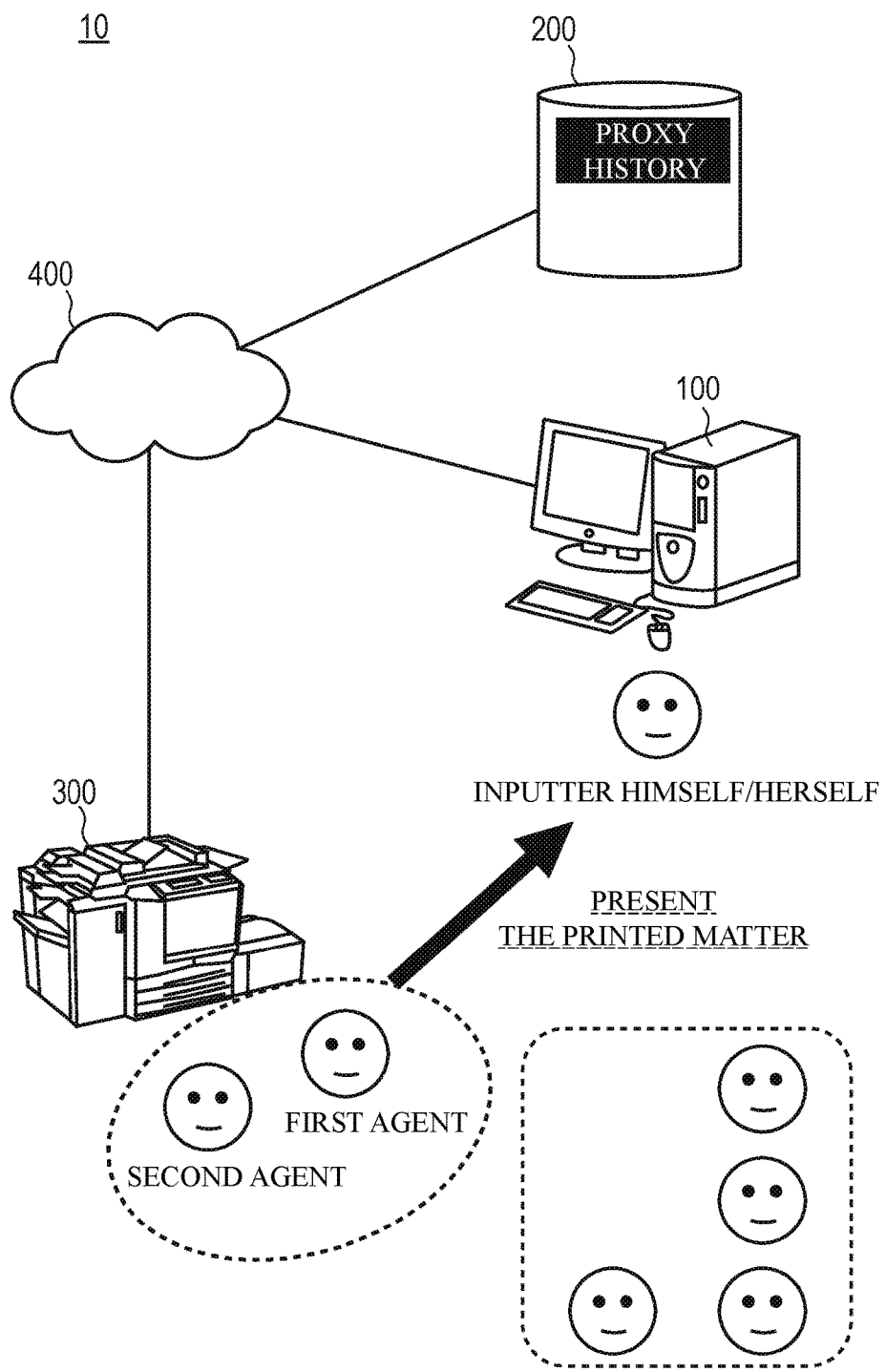
FIG. 21 is a diagram illustrating a state when an outputted printed matter is presented.

Furthermore, FIG. 16 is a diagram for explaining an operation when a first agent performs authentication. FIG. 17 is a diagram illustrating an example of a schematic data structure of the authentication history data. FIG. 18 is a diagram for explaining an operation when a second agent performs authentication. FIG. 19 is a diagram for explaining an operation when a printed matter is output. FIG. 20 is a diagram for explaining an operation when re-authentication is performed after the output of a printed matter. FIG. 21 is a diagram illustrating a state when an outputted printed matter is presented.

Hereinafter, with reference to FIG. 15 to FIG. 21, the procedure of the proxy printing process will be described.

When power is supplied, the control unit 210 of the print management apparatus 200 starts the proxy printing process.

(Step S201)

When the proxy printing process starts, the control unit 210 serves as the authentication unit 540, and determines whether identification information of a user intended to perform printing has been provided from the image forming apparatus 300.

Normally, as illustrated in FIG. 16, a user (a first agent in the illustrated example) intended to perform printing goes to a place of the image forming apparatus 300 and allows a carried electronic appliance (an IC card, etc.) to approach the identification information acquisition unit 350 of the image forming apparatus 300. In this way, identification information of the user stored in the electronic appliance is provided to the image forming apparatus 300 by near field communication, etc. At this time, the image forming apparatus 300 transmits the identification information provided from the user to the print management apparatus 200 via the network 400.

Then, when the identification information of the user intended to perform printing is not received (step S201: NO), the control unit 210 waits for the reception of the identification information. On the other hand, when the identification information of the user intended to perform printing is received (step S201: YES), the control unit 210 allows the procedure to proceed to step S202.

Hereinafter, a designated agent, who has firstly provided identification information among a plurality of designated agents, is called a "first agent", and designated agents are called a "second agent" and a "third agent" according to an order in which they has provided identification information.

(Step S202)

Returning to FIG. 15, the control unit 210 serves as the authentication unit 540, and authenticates that the user having provided the identification information in step S201 is the designated agent (the first agent). In detail, the control unit 210 inquires of the designated agent information of the proxy condition data stored in the job storage unit 530 in step S105 about the identification information provided in step S201. Then, the control unit 210 determines authentication success when data coinciding with the identification information exists in the designated agent information. On the other hand, when data coinciding with the identification information does not exist in the designated agent information, the control unit 210 determines authentication failure. In any cases, the control unit 210 notifies the image forming apparatus 300 of the authentication result. In addition, when succeeding in the authentication, the image forming apparatus 300 having received the notification permits login of the designated agent, and then maintains the login state until proxy printing is ended. However, when failing in the authentication, the image forming apparatus 300 rejects login.

Furthermore, when succeeding in the authentication, the control unit 210 stores an individual ID (an authenticated ID) of the first agent, who has provided the identification information in step S201, and an authentication time thereof in the authentication history storage unit 550 as authentication history data illustrated in FIG. 17. In addition, the authentication time is generated by the acquisition, etc., of a system time of the print management apparatus 200.

(Step S203)

The control unit 210 serves as the authentication unit 540, and determines whether the purpose of the user having provided the identification information in step S201 is proxy printing or normal printing (printing other than the proxy printing).

For example, after step S201, in the image forming apparatus 300, the control unit 310 serves as the display control unit 630, and displays a screen for confirming whether the purpose of the user is the proxy printing or the normal printing on the touch panel unit 340, etc. At this time, the image forming apparatus 300 receives an operation for selecting the proxy printing or the normal printing from the user, and transmits a signal indicating the proxy printing or a signal indicating the normal printing to the print management apparatus 200.

Then, when the signal indicating the proxy printing is received (step S203: YES), the control unit 210 allows the procedure to proceed to step S205. On the other hand, when the signal indicating the normal printing is received (step S203: NO), the control unit 210 allows the procedure to proceed to step S204.

(Step S204)

The control unit 210 serves as the print control unit 560 and controls the image forming apparatus 300 to perform the normal printing. In detail, the control unit 210 transmits the print job stored in the job storage unit 530 in step S101 to the image forming apparatus 300. The control unit 310 of the image forming apparatus 300 having received the print job serves as the print execution unit 620 and performs printing based on the print job. In this way, a printed matter by the normal printing is output to a paper discharge tray, etc., of the image forming apparatus 300.

Thereafter, the control unit 210 ends the proxy printing process.

(Step S205)

The control unit 210 serves as the authentication unit 540, and determines whether identification information of a user (a second agent in the illustrated example) intended to newly perform printing has been provided from the image forming apparatus 300 as illustrated in FIG. 18. In addition, since the process of step S205 is equal to the process of step S201, a detailed description thereof will be omitted.

Returning to FIG. 15, when the identification information of the user intended to newly perform printing is not received (step S205: NO), the control unit 210 waits for the reception of the identification information. On the other hand, when the identification information of the user intended to newly perform printing is received (step S205: YES), the control unit 210 allows the procedure to proceed to step S206.

(Step S206)

The control unit 210 serves as the authentication unit 540, and authenticates that the user having provided the identification information in step S205 is a designated agent (a designated agent after the first agent). In addition, since the authentication method of step S206 is equal to that of step S202, a detailed description thereof will be omitted.

Furthermore, when succeeding in the authentication of the designated agent having provided the identification information in step S205, the control unit 210 adds an individual ID (an authenticated ID) of the designated agent and an authentication time thereof to the authentication history storage unit 550 as the authentication history data illustrated in FIG. 17.

(Step S207)

The control unit 210 serves as the print control unit 560, and determines whether designated agents corresponding to the number designated in step S103 have ended authentication (limited to the case of success of the authentication). In detail, the control unit 210 reads the authentication history data from the authentication history storage unit 550, counts the number of authenticated designated agents, and compares the counted number with the designated person number information of the proxy condition data stored in the job storage unit 530 in step S105. When the counted number is smaller than the number included in the designated person number information, the control unit 210 determines that authentication corresponding the designated number has not been ended (step S207: NO), and allows the procedure to proceed to step S208. On the other hand, when the counted number reaches the number included in the designated person number information, the control unit 210 determines that the authentication corresponding the designated number has been ended (step S207: YES), and allows the procedure to proceed to step S210.

(Step S208)

The control unit 210 determines whether an instruction for stopping the proxy printing has been made.

For example, in the image forming apparatus 300, when an operation for stopping the proxy printing is received, the control unit 310 transmits a signal indicating the stop of the proxy printing to the print management apparatus 200.

Then, when the signal indicating the stop of the proxy printing is received (step S208: YES), the control unit 210 ends the proxy printing process. On the other hand, when the signal indicating the stop of the proxy printing is not received (step S208: NO), the control unit 210 allows the procedure to proceed to step S209.

(Step S209)

The control unit 210 determines whether a predetermined time has lapsed after the first agent completes the authentication in step S202. For example, the control unit 210 acquires a system time (a current time) of the print management apparatus 200. Then, when the control unit 210 reads the authentication history data from the authentication history storage unit 550 and a predetermined time (for example, 30 minutes) has lapsed from the authentication time of the first agent (step S209: YES), the control unit 210 releases the login state and ends the proxy printing process. Consequently, when the designated agents corresponding to the designated number do not complete authentication within a predetermined time, the control unit 210 forcibly ends the proxy printing process. On the other hand, when the acquired system time has not lapsed by a predetermined time from the authentication time of the first agent (step S209: NO), the control unit 210 allows the procedure to return to step S205.

(Step S210)

The control unit 210 serves as the print control unit 560 and controls the image forming apparatus 300 to perform the proxy printing. In detail, the control unit 210 transmits the print job stored in the job storage unit 530 in step S101 to the image forming apparatus 300 as illustrated in FIG. 19. The control unit 310 of the image forming apparatus 300 having received the print job serves as the print execution unit 620 and performs printing based on the print job. In this way, a printed matter by the proxy printing is output to the paper discharge tray, etc., of the image forming apparatus 300. At this time, an output situation of the printed matter is confirmed by the designated agents corresponding to the designated number as illustrated in FIG. 19. Therefore, a case, in which the designated agents (the first agent and the second agent in the illustrated example) mutually confirm (monitor) the printed matter, inevitably occurs.

(Step S211)

After the output of the printed matter in step S210, the control unit 210 serves as the printing post-processing unit 570, and performs re-authentication in order to confirm whether all designated agents having been already authenticated have been present to the end of the printed matter.

In detail, as illustrated in FIG. 20, all the designated agents (the first agent and the second agent in the illustrated example) having been already authenticated allow carried electronic appliances (IC cards, etc.) to approach the identification information acquisition unit 350 of the image forming apparatus 300. In this way, identification information of each designated agent is provided to the image forming apparatus 300 by near field communication, etc. At this time, the image forming apparatus 300 transmits the identification information provided from each designated agent to the print management apparatus 200 via the network 400 as illustrated in FIG. 20.

The control unit 210 of the print management apparatus 200 inquires of the authentication history data stored in the authentication history storage unit 550 about the received identification information of each designated agent. Then, when all data coinciding with the identification information of each designated agent exists in the authentication history data, the control unit 210 determines that the re-authentication is success. On the other hand, when the data coinciding with the identification information of each designated agent does not exist in the authentication history data by an amount corresponding to even one person, the control unit 210 determines that the re-authentication is failure. In any cases, the control unit 210 notifies the job inputting apparatus 100 of a result of the re-authentication. In this way, an inputter himself/herself can confirm whether a designated agent having received an output request of a printed matter has been present to the end of printing.

After step S211, the control unit 210 ends the proxy printing process. As illustrated in FIG. 21, each designated agent presents the outputted printed matter to the inputter himself/herself while maintaining the mutual confirmation (monitoring).

The aforementioned proxy printing process is performed, so that it is not possible to output a printed matter from the image forming apparatus 300 until the designated agents corresponding to the designated number finish authentication (step S207). Therefore, it is possible to prevent some designated agents from forgetting or leaving a printed matter on the paper discharge tray of the image forming apparatus 300, or to prevent the printed matter from being distributed to an improper third party. That is, it is possible to maintain a security level similarly to the case in which an inputter himself/herself outputs a printed matter.

Furthermore, all designated agents authenticated before the output of a printed matter need to be authenticated again after the output of the printed matter (step S211). Therefore, it is possible to prevent some designated agents from being apart from the image forming apparatus 300 in the course of printing, and to maintain the state of mutual confirmation (monitoring) between designated agents more reliably.

In addition, each processing unit of the aforementioned each flowchart has been divided in response to main processing content in order to facilitate the understanding of the print management system 10. The present invention is not limited by classification methods of processing steps or names thereof. The processes performed in the print management system 10 can be divided into many more processing steps. Furthermore, one processing step may also perform many more processes.

<Modification>

Furthermore, the aforementioned embodiment intends to exemplify the scope of the present invention and does not limit the present invention. Many alternatives, corrections, and modifications are apparent by those skilled in the art.

For example, in the aforementioned embodiment, the example, in which each designated agent goes to a place of one of a plurality of image forming apparatuses 300 in order to output a printed matter, has been described. However, when the number of designated agents is large (for example, more than 10 persons), there is a case in which the designated agents are classified into a plurality of groups and the designated agents of each group go to different places of the image forming apparatuses 300. In this case, in the print management system 10, the output of a printed matter is performed only in an image forming apparatus 300 in which designated agents corresponding to a designated number have first completed authentication.

Figure 22:
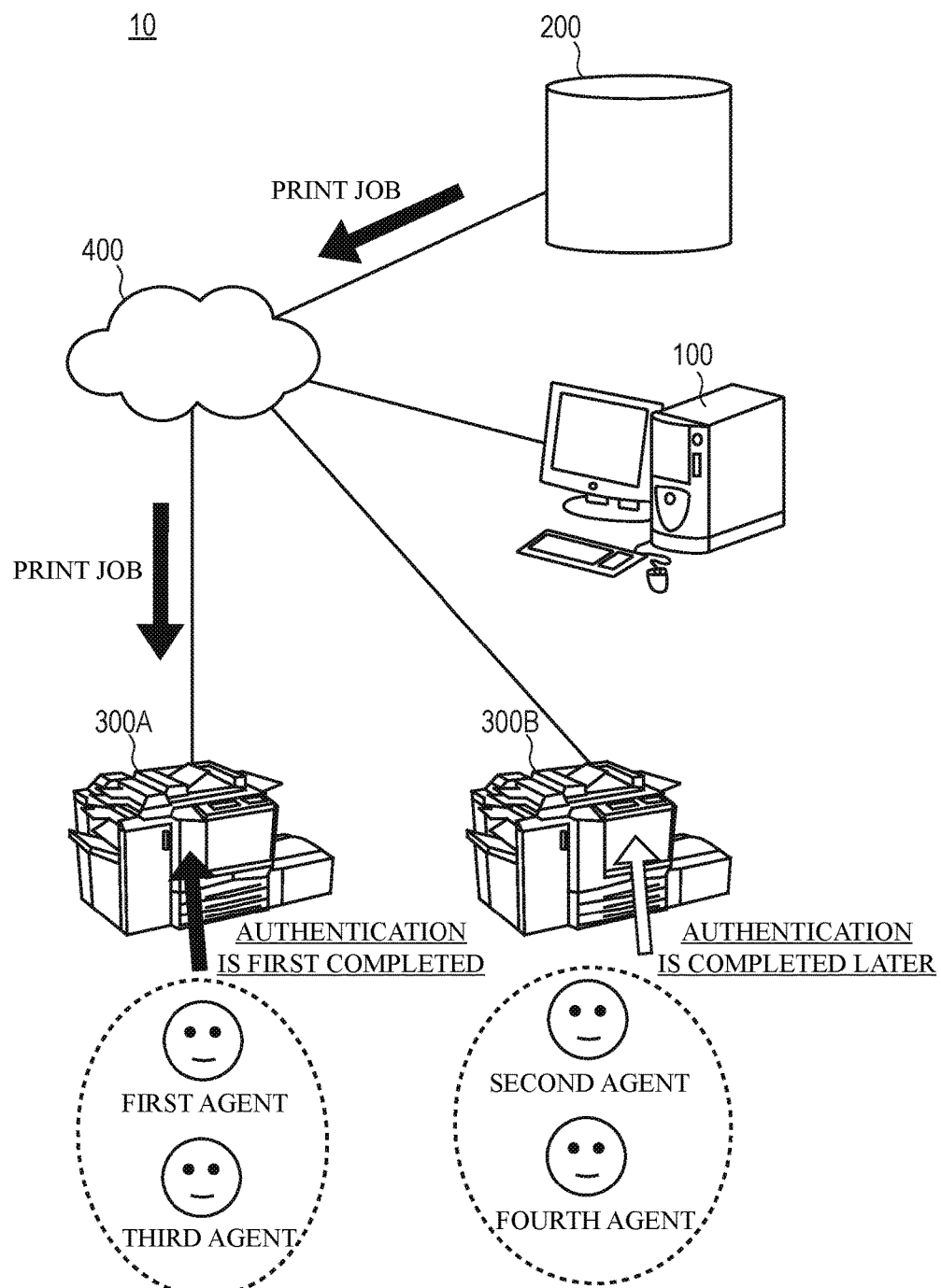
FIG. 22 is a diagram for explaining an operation when authentication of designated agents has been performed from different image forming apparatuses.

FIG. 22 is a diagram for explaining an operation when authentication of designated agents has been performed from different image forming apparatuses. In the example illustrated in FIG. 22, a first agent and a second agent perform authentication in different image forming apparatuses 300A and 300B. At the time at which the second agent has completed the authentication, since authentication corresponding to a designated number (two persons in this example) has not been completed in all the image forming apparatuses 300A and 300B, no printed matter is output. Thereafter, when a third agent completes authentication in the image forming apparatus 300A, the print management system 10 outputs a printed matter from the image forming apparatus 300A in which the authentication corresponding to two persons of the first agent and the third agent has been completed. In this way, no printed matter is output from the other image forming apparatus 300B, and there is no problem that mutual confirmation (monitoring) among different groups are not possible.

Furthermore, when authentication of designated agents has been performed from the different image forming apparatuses 300A and 300B, the print control unit 560 prevents information on a print job from being displayed on the image forming apparatus 300B other than the image forming apparatus 300A to which the initial first agent has provided identification information in order to perform authentication. In this way, the information on a print job is prevented from being unexpectedly leaked to the third party, etc.

Furthermore, in the aforementioned embodiment, when authentication corresponding to a designated number has been completed, a print job is transmitted (downloaded) from the print management apparatus 200 to the image forming apparatus 300 (step S210). However, the present invention is not limited thereto, and when the authentication of the first agent has been initially completed (limited to the case of success of the authentication), a print job may also be transmitted from the print management apparatus 200 to the image forming apparatus 300. In this way, it is possible to shorten a waiting time of a designated agent until printing is started in the image forming apparatus 300 after authentication corresponding to a designated number is completed.

Furthermore, in the aforementioned embodiment, the designated agent information, the designated person number information, and the proxy authority information are designated for a print job. However, the present invention is not limited thereto, and if at least the designated agent information and the designated person number information are designated, the proxy authority information may not be designated.

Furthermore, in the aforementioned embodiment, a print job inputted from the job inputting apparatus 100 is temporarily stored in the print management apparatus 200 and then is transmitted to the image forming apparatus 300. However, the present invention is not limited thereto, and the print job may also be directly transmitted to the image forming apparatus 300 from the job inputting apparatus 100. However, in this case, setting information of the print job and proxy conditions (data) are separated from the print job and are transmitted to the print management apparatus 200 similarly to the aforementioned embodiment.

Furthermore, in the aforementioned embodiment, the condition acquisition unit 520 of the print management apparatus 200 acquires the proxy conditions (including at least the designated agent information and the designated person number information) designated for a print job after the acquisition of the print job (steps S101 and S105). However, the present invention is not limited thereto, and the condition acquisition unit 520 may also acquire the proxy conditions together with the acquisition of the print job. Furthermore, the condition acquisition unit 520 may also acquire the proxy conditions before the acquisition of the print job.

Furthermore, in the aforementioned embodiment, when the first agent is authenticated by the authentication unit 540 and then designated agents corresponding to a designated number have been authenticated within a predetermined time, the print control unit 560 allows the image forming apparatus 300 to perform printing (step S207). In the aforementioned embodiment, the length of the predetermined time is not changed, but may also be changed in response to the number of persons designated by the designated person number information. For example, the length of the predetermined time may also be increased in proportion to the number of persons designated by the designated person number information.

Furthermore, in the aforementioned embodiment, the printing post-processing unit 570 allows all authenticated designated agents before the output of a printed matter to be authenticated again after the output of the printed matter (step S211). However, the present invention is not limited thereto, and the process by the printing post-processing unit 570 may also be omitted. For example, the process by the printing post-processing unit 570 may also be omitted by the degree of importance of security or designation of an inputter himself/herself.

Furthermore, the image forming apparatus 300 may also be integrally provided with the print management apparatus 200. Furthermore, the whole or apart (for example, only the functions of the authentication unit 540) of the functions of the print management apparatus 200 may also be provided to the image forming apparatus 300. In this case, the functions of the print management apparatus 200 may also be provided to one image forming apparatus 300, or may also be distributed and provided to a plurality of image forming apparatuses 300.

The configuration of the print management system 10 has been described by describing a main configuration when describing the characteristics of the aforementioned each embodiment, and is not limited to the aforementioned configuration. Furthermore, a general configuration of the print management system 10 is not excluded.

Furthermore, each functional configuration of the print management system 10 illustrated in FIG. 5 to FIG. 7 has been classified in response to main processing content in order to facilitate the understanding of each functional configuration. The present invention is not limited by classification methods or names of elements. Each functional configuration can also be divided into many more elements in response to processing content. Furthermore, one element can also be classified so as to perform many more processes.

Furthermore, processes of each functional configuration illustrated in FIG. 5 to FIG. 7 can also be realized by a dedicated hardware circuit. In this case, the processes may also be performed by one hardware or a plurality of types of hardware.

Furthermore, the program operating the print management system 10 may also be provided by a computer-readable recording medium such as a USB memory, a flexible disk, and CD-ROM, or may also be provided on-line via a network such as the Internet. In this case, the program recorded on the computer-readable recording medium is typically is transmitted to and stored in the memories (112, 212, and 312), the storages (113, 213, and 313), etc. Furthermore, the program, for example, may also be provided as single application software, or may also be incorporated in software of the print management system 10 as one function of the print management system 10.

What is claimed is:

1. A print management apparatus comprising:
a processing device configured to:
acquire designated agent information designating a plurality of agents capable of performing proxy printing based on a print job;
acquire designated person number information associated with said print job, the designated person number information specifying a number of agents required to perform authentication in order to perform printing based on said print job;
receive user identification information from a user intending to perform printing;
authenticate that said user is an agent designated by said designated agent information; and
allow an image forming apparatus to perform said printing based on said print job when a number of agents corresponding to said number of agents specified by said designated person number information are authenticated by said processing device via said image forming apparatus.

2. The print management apparatus as claimed in claim 1, wherein said processing device further acquires proxy authority information for designating authority to be assigned to said agents; and
said proxy authority information includes information for designating any one of authority for permitting proxy printing in units of print jobs and authority for collectively permitting proxy printing for all print jobs held by an inputter himself/herself.

3. The print management apparatus as claimed in claim 1, wherein said processing device acquires a print job, and said designated agent information and said designated person number information associated with said print job.

4. The print management apparatus as claimed in claim 1, wherein
after acquisition of a print job, said processing device acquires said designated agent information and said designated person number information associated with said print job.

5. The print management apparatus as claimed in claim 1, wherein
before acquisition of a print job, said processing device acquires said designated agent information and said designated person number information associated with said print job.

6. The print management apparatus as claimed in claim 1, wherein
in relation to said printing based on said print job, when agents corresponding to said number specified by said designated person number information are authenticated within a predetermined time after a first agent is authenticated by said processing device, said processing device allows said image forming apparatus to perform said printing.

7. The print management apparatus as claimed in claim 6, wherein
said processing device changes a length of said predetermined time in response to said number specified by said designated person number information.

8. The print management apparatus as claimed in claim 1, wherein said processing device is further configured to:
inquire of authentication history about identification information provided again from all agents having been already authenticated after said printing by said image forming apparatus is completed, determine whether said all agents have been present to end of said printing, and output a result of said determination.

9. The print management apparatus as claimed in claim 8, wherein
a process by said processing device is omitted by a degree of importance of security or designation of an inputter himself/herself.

10. The print management apparatus as claimed in claim 1, wherein
in relation to said printing based on said print job, said processing device prevents information on said print job from being displayed on an image forming apparatus, other than an image forming apparatus to which an first agent has provided identification information for authentication.

11. The print management apparatus as claimed in claim 1, wherein
in relation to said printing based on said print job, when an first agent has been authenticated by said processing device, said processing device inputs said print job to said image forming apparatus, and starts said printing of said print job when said agents corresponding to said number specified by said designated person number information are authenticated.

12. The print management apparatus as claimed in claim 1, wherein
a plurality of image forming apparatuses becoming a group are registered in advance, and said plurality of image forming apparatuses are managed as a group.

13. A non-transitory computer readable recording medium stored with a print management program, said print management program causing a computer to execute a process comprising the steps of:
(A) acquiring designated agent information designating a plurality of agents capable of performing proxy printing based on a print job,
(B) acquiring designated person number information associated with said print job, the designated person number information specifying a number of agents required to perform authentication in order to perform printing based on said print job;
(C) receiving user identification information from a user intending to perform printing;
(D) authenticating that said user is an agent designated by said designated agent information; and
(E) allowing an image forming apparatus to perform said printing based on said print job when a number of agents corresponding to said number of agents specified by said designated person number information are authenticated via said image forming apparatus.

14. A print management system including a plurality of image forming apparatuses becoming a group and a print management apparatus for managing said plurality of image forming apparatuses, wherein
said print management apparatus comprises a processing device configured to:
acquire designated agent information designating a plurality of agents capable of performing proxy printing based on a print job,
acquire designated person number information for each print job, the designated person number information specifying a number of agents required to perform authentication in order to perform printing based on said print job,
one of said plurality of image forming apparatuses comprises a processing device configured to:
transmit identification information of a user intended to perform printing to said print management apparatus when said identification information is provided from said user,
said processing device of said print management apparatus is further configured to:
authenticate that said user is an agent designated by said designated agent information; and
instruct an image forming apparatus to perform said printing based on said print job when a number of agents corresponding to said number of agents specified by said designated person number information are authenticated by said processing device of said print management apparatus via said image forming apparatus, and
said processing device of said image forming apparatus is further configured to:
perform printing designated by said processing device of said print management apparatus.

15. The print management system as claimed in claim 14, wherein
said processing device of said image forming apparatus is further configured to:
display a screen for confirming proxy printing or printing other than said proxy printing when said identification information of said user intended to perform printing is provided from said user.

16. The print management system as claimed in claim 15, wherein
said processing device of said image forming apparatus prevents information based on said print job from being displayed until said agents corresponding to said number specified by said designated person number information are authenticated in relation to said printing based on said print job.

17. The print management system as claimed in claim 14, further comprising:
a job inputting apparatus that inputs a print job,
wherein
said job inputting apparatus comprises a processing device that transmits an electronic mail addressed to an agent included in said designated agent information.

18. The print management system as claimed in claim 17, wherein
said processing device of said job inputting apparatus associates names, individual IDs, and mail addresses of candidates of said agents with one another for storage.

19. An image forming apparatus integrally provided with said print management apparatus as claimed in claim 1.

20. The print management apparatus of claim 1, wherein the designated person number information specifies a number of at least two designated agents.

* * * * *